US012024095B2

(12) United States Patent
Persson et al.

(10) Patent No.: US 12,024,095 B2
(45) Date of Patent: *Jul. 2, 2024

(54) LINING FOR A HAUL TRUCK BODY, A TRANSITION LINING ELEMENT AND A METHOD FOR FASTENING A LINING

(71) Applicant: Metso Sweden AB, Trelleborg (SE)

(72) Inventors: Henrik Persson, Trelleborg (SE); Fredrik Larsson, Malmö (SE)

(73) Assignee: Metso Sweden AB, Trelleborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,189

(22) Filed: Oct. 27, 2022

(65) Prior Publication Data

US 2023/0052791 A1 Feb. 16, 2023

Related U.S. Application Data

(63) Continuation of application No. 16/623,643, filed as application No. PCT/EP2018/066645 on Jun. 21, 2018, now Pat. No. 11,485,295.

(30) Foreign Application Priority Data

Jun. 22, 2017 (SE) .................................. 17177444-1

(51) Int. Cl.
*B60R 13/01* (2006.01)
*B60P 1/28* (2006.01)
*B62D 25/20* (2006.01)

(52) U.S. Cl.
CPC .......... *B60R 13/01* (2013.01); *B62D 25/2072* (2013.01); *B60P 1/286* (2013.01)

(58) Field of Classification Search
CPC .............. B60R 13/01; B60R 2013/015; B60R 2013/018; B62D 25/2072; B60P 1/28; B60P 1/283; B60P 1/286
See application file for complete search history.

(56) References Cited

U.S. PATENT DOCUMENTS 3,578,375 A 5/1971 Finefrock
3,652,123 A 3/1972 Speers
(Continued)

FOREIGN PATENT DOCUMENTS

CA 2262750 A1 9/1997
CL 201903690 12/2019
(Continued)

OTHER PUBLICATIONS

International Search Report and Written Opinion for International Application No. PCT/EP2018/066645 dated Sep. 26, 2019.
(Continued)

*Primary Examiner* — Gregory A Blankenship
(74) *Attorney, Agent, or Firm* — Andrus Intellectual Property Law, LLP

(57) ABSTRACT

The disclosure relates to a lining for a haul truck body, said lining comprising a plurality of main lining elements arranged to extend over main surfaces of said haul truck body, and a plurality of transition lining elements arranged to extend over edge and/or corner portions of the haul truck body, wherein each transition lining element forms a lining transition between at least two non-parallel main lining elements of said plurality of main lining elements, and wherein said plurality of transition lining elements comprises at least one non-linear transition lining element which has a first and a second leg portion extending in non-parallel first and second leg directions, respectively. The disclosure further relates to a transition lining element for a haul truck body and a method for assembling a lining.

18 Claims, 13 Drawing Sheets

(56) References Cited

U.S. PATENT DOCUMENTS

| | | | | |
|---|---|---|---|---|
| 4,333,678 | A | 6/1982 | Munoz | |
| 5,803,531 | A | 9/1998 | Nielsen | |
| 5,851,043 | A | 12/1998 | Moutrey | |
| 11,485,295 | B2 * | 11/2022 | Persson | B62D 25/2072 |
| 2004/0026959 | A1 | 2/2004 | Kostecki | |
| 2005/0126056 | A1 | 6/2005 | Kostecki | |
| 2011/0181067 | A1 | 7/2011 | Dunn | |
| 2012/0207581 | A1 | 8/2012 | Hagenbuch | |
| 2013/0094936 | A1 | 4/2013 | Hagenbuch | |
| 2014/0054925 | A1 | 2/2014 | Hyde et al. | |
| 2014/0327265 | A1 | 11/2014 | Burstrom | |
| 2014/0354004 | A1 | 12/2014 | Burstrom | |
| 2015/0061311 | A1 | 3/2015 | Natarajan et al. | |
| 2016/0194035 | A1 | 7/2016 | Lu | |
| 2017/0174148 | A1 | 6/2017 | Fujan | |
| 2020/0180522 | A1 | 6/2020 | Larsson | |
| 2020/0215995 | A1 | 7/2020 | Persson | |
| 2020/0398727 | A1 | 12/2020 | Hallevall | |
| 2021/0146855 | A1 | 5/2021 | Larsson | |
| 2021/0146856 | A1 | 5/2021 | Larsson | |
| 2023/0001862 | A1 * | 1/2023 | Persson | B60R 13/01 |
| 2023/0052791 | A1 * | 2/2023 | Persson | B60R 13/01 |

FOREIGN PATENT DOCUMENTS

| | | | |
|---|---|---|---|
| CL | 201903691 | | 12/2019 |
| CL | 201903692 | | 12/2019 |
| CL | 201903693 | | 12/2019 |
| CN | 102030170 | A | 8/2012 |
| CN | 103395385 | A | 11/2013 |
| DE | 29819674 | U1 | 2/1999 |
| DE | 10240799 | A | 2/2004 |
| EP | 0098127 | A1 | 1/1984 |
| EP | 2607160 | A1 | 6/2013 |
| SU | 1594046 | A2 | 9/1990 |
| UA | 82537 | U | 8/2013 |
| UA | 82539 | U | 8/2013 |
| WO | 2018234490 | | 12/2018 |
| WO | 2018234494 | | 12/2018 |
| WO | 2018234497 | | 12/2018 |
| WO | 2018234510 | | 12/2018 |

OTHER PUBLICATIONS

Office Action and Search Report for Corresponding Russian Patent Application No. 2019141311, dated Nov. 8, 2021.

Search Report for corresponding Chinese Patent Application No. 201880041286.4 dated Jul. 27, 2021.

Search Report for corresponding Chilean Patent Application No. 201903693 dated Nov. 16, 2020.

Search Report for corresponding Chilean Patent Application No. 201903689 dated Nov. 9, 2020.

Acceptance Decision for corresponding Ukraine Application No. 2019 11841, dated Feb. 1, 2022.

* cited by examiner

LINING FOR A HAUL TRUCK BODY, A TRANSITION LINING ELEMENT AND A METHOD FOR FASTENING A LINING

CROSS REFERENCE TO RELATED APPLICATIONS

This application is a continuation application of prior U.S. patent application Ser. No. 16/623,643, filed Dec. 17, 2019 and now issued as U.S. Pat. No. 11,485,295, which is the U.S. national stage application of International Application PCT/EP2018/066645, filed Jun. 21, 2018, which international application was published on Dec. 27, 2018, as International Publication WO 2018/234490 A1 in the English language. The International Application claims priority of European Patent Application No. 17177444.1 filed Jun. 22, 2017.

TECHNICAL FIELD

The disclosure relates to a lining for a haul truck body and a transition lining element for use in a haul truck body. The disclosure further relates to a method for fastening a lining for a haul truck body.

BACKGROUND

Haul trucks are off-highway dump trucks engineered for use in high-production mining and heavy-duty construction environments. The haul trucks are equipped with haul truck bodies capable of accommodating a large amount of material, such as rock, crushed ore or the like. Haul truck capacities range from 40 short tons (36 t) to 496 short tons. Hauling such masses of often sharp and heavy load makes the haul truck body experiencing a heavy wear due to impact and abrasion.

To protect the surface of the haul truck body, it is common to equip the interior if the haul truck body with a lining. Whereas the haul truck body usually is made from steel, the lining material is often made from another material. One commonly used type of lining is an elastic lining comprising for example a rubber material or polyurethane. An advantage of the elastic lining material is that its material properties may be used to mitigate the effects of heavy impact of material on the haul truck body as material is hauled from quite some altitude onto the haul truck body from for example an excavator. The elastic lining material effectively absorbs the energy from the impact distributing said energy over a larger area. Moreover, the noise is reduced and the comfort for the operator improved. Lining for haul trucks are usually made from a plurality of lining elements extending over surfaces of the haul truck body to form the lining. The separate lining elements simplifies manufacture by limiting its dimensions and mass. Moreover, it facilitates service of the haul truck body, as individual damaged or worn-out lining elements may be exchanged directly on site without having to remove large parts of the surrounding lining.

A problem with such a lining for a haul truck body is that material tends to find its way down through the openings between adjacent lining elements. Once there, the material may create further damage to the lining by exposing the fastening elements to wear. Moreover, the trapped material increases the carry-back, i.e. the amount of material which is prevented from leaving the haul truck body during prolonged operation. Carry-back is unwanted as it prevents equipment from performing at full capacity and when the piece of equipment is associated directly with production, maximum possible throughout is compromised. Secondary effects of carry-back include higher maintenance costs due to quicker material wear and extra downtime required to clean equipment.

SUMMARY OF INVENTION

In the light of the above, it is an object of the present disclosure to mitigate, alleviate or eliminate one or more of the above-identified deficiencies in the art and disadvantages singly or in any combination and solve at least the above mentioned problem.

According to a first aspect, there is provided a lining for a haul truck body, said lining comprising a plurality of main lining elements arranged to extend over main surfaces of said haul truck body, and a plurality of transition lining elements arranged to extend over edge and/or corner portions of the haul truck body, each transition lining element forming a lining transition between non-parallel main lining elements of said plurality of main lining elements;

- wherein said plurality of transition lining elements comprises at least one non-linear transition lining element which has a first and a second leg portion extending in non-parallel first and second leg directions, respectively, said first leg portion forming a first lining transition between a first pair of non-parallel main lining elements, and said second leg portion forming a second lining transition between a second pair of non-parallel main lining elements; and
- wherein three main lining elements of said first pair and said second pair of main lining elements are all non-parallel to each other.

Thus, in other words, there is provided a lining for a haul truck body, said lining comprising a plurality of main lining elements arranged to extend over main surfaces of said haul truck body, and a plurality of transition lining elements arranged to extend over edge and/or corner portions of the haul truck body, wherein each transition lining element forms a lining transition between at least two non-parallel main lining elements of said plurality of main lining elements, and wherein said plurality of transition lining elements comprises at least one non-linear transition lining element which has a first and a second leg portion extending in non-parallel first and second leg directions, respectively.

The lining presents at least the following advantages:

When a transition lining element of the lining is disposed in a corner or along wedged portions of the haul truck body, the transition lining element may prevent or at least substantially reduce the occurrence of a gap in a lining close to the corner or wedged portion. This may reduce the risk of material present within the haul truck body to penetrate through the gap entering a space beneath the lining elements, which increases the risk of damage to the lining and increases the carry-back.

The non-linear transition lining element may be designed such as to fit in a corner portion or a wedged portion of a specific haul truck body. The use of such a transition lining element thus decreases the complexity of installing a lining to a haul truck body, as a single element may replace two or more separate conventional lining elements.

The use of transition lining elements allows for forming a uniform lining transition between main lining elements of different thicknesses. For example, transition lining elements may be used to form a smooth transition between a 15 cm thick lining on the bottom of the haul truck body to a 10 cm thick lining on a side wall of the haul truck body. Thus, the transition lining elements makes it possible to avoid forming recesses and/or edges within the lining where main lining elements of different thickness meet each other. Said recesses and/or edges are unwanted as they may result in material getting stuck, and subsequently penetrating through the gap between the main lining elements forming the recess and/or edge.

According to some embodiments, the main lining elements form a bottom lining, a front lining and two opposite side linings, wherein said at least one non-linear transition lining element comprises at least one corner lining element forming a lining transition between three non-parallel main lining elements which are located at a corner of said lining and which form part of the bottom lining, the front lining and one of the two opposite side linings, respectively.

According to some embodiments, said plurality of main lining elements form a bottom lining, a front lining and two opposite side linings, wherein said three non-parallel main lining elements of the first pair and the second pair of main lining elements are located at a corner of said lining so as to form part of the bottom lining, the front lining and one of the two opposite side linings, respectively, and wherein said at least one non-linear transition lining element comprises at least one corner lining element forming said first and second lining transitions between said three non-parallel main lining elements.

According to some embodiments, the corner lining element further presents a third leg portion extending in a third leg direction different from said first and second leg directions, and wherein each one of said first, second and third leg portions extends from said corner to an adjacent transition lining element of said plurality of transition lining elements. The third leg portion may be advantageous as it allows for the corner lining element to protect the corner from all sides. In other words, there will be no gap in the lining providing a direct access for material to the corner. Furthermore, the corner lining element may be designed such as to avoid forming a gap close to an edge formed between different portions of the lining.

According to some embodiments, the corner lining element further presents a third leg portion extending in a third leg direction different from said first and second leg directions, wherein the third leg portion forms a third lining transition between a third pair of non-parallel main lining elements, wherein three main lining elements of the first, second and third pairs of main lining elements are all non-parallel with each other, and wherein each one of said first, second and third leg portions extends from said corner to an adjacent transition lining element of said plurality of transition lining elements.

It is understood that the at least one non-linear transition lining element forms at least two lining transitions between main lining elements of the first and second pairs of main lining elements. The at least two lining transitions are formed along a respective transition direction. The transition lining element may have two leg portions, i.e. the first and second leg portions. In such a case, the transition lining element forms two lining transitions, i.e. the first and second lining transitions. The first lining transition is formed along a first transition direction between the first pair of non-parallel main lining elements, and the second lining transition is formed along a second transition direction between the second pair of non-parallel main lining elements. The first transition direction is different from the second transition direction. The first lining transition is formed over/by the first leg portion, and the second lining transition is formed over/by the second leg portion.

In case the transition lining element has a third leg portion, which may be the case if the element is a corner element, the transition lining element forms three lining transitions. In addition to the first and second lining transitions, a third lining transition is formed along a third transition direction between the third pair of non-parallel main lining elements. The third transition direction is different from each one of the first and second transition directions. Each lining transition is formed over/by a respective leg portion of the transition lining element.

The lining transitions are formed between main lining elements of the lining. Each lining transition is formed between a pair of main lining elements. The main lining elements of each pair of main lining elements are disposed on opposite sides of the respective leg portion. Thus, at least three main lining elements are required to form the lining transitions, either being it two lining transitions over two leg portions, or three lining transitions over three leg portions. Thus, it is understood that each pair of main lining elements, such as the first pair and second pair of main lining elements, may have one main lining element in common.

It is further understood that, in use of a non-linear transition lining element, the first leg direction, the second leg direction (and in case of at least some corner lining elements: also the third leg direction) are all aligned along respective edges of the haul truck body. Thus, the leg portions forms transitions between bottom, side and front linings, respectively.

According to some embodiments, the plurality of main lining elements form a bottom lining, a front lining and two opposite side linings, said bottom lining presenting non-parallel first and second mutually inclined bottom lining portions, and wherein said at least one non-linear transition lining element comprises a wedge lining element forms lining transitions between the three non-parallel main lining elements which are located at a wedge area of said lining and which form part of the front lining, the first bottom lining portion and the second bottom lining portion, respectively. The wedge lining element may be advantageous as it allows for protecting the wedge area from all sides. In other words, there will be no gap in the lining providing a direct access for material to the wedged area.

According to some embodiments, the non-parallel first and second leg directions extend in a common plane parallel to the front lining.

According to some embodiments, at least some of said plurality of transition lining elements present a concave surface facing an interior of the haul truck body. The concave surface may be substantially cylindrical along a respective main surface portion. The concave surfaces may be advantageous as they may prevent material to stick to the edges of the haul truck body, and thus aids in reducing the carry-back problem.

According to some embodiments, at least one transition lining element of said plurality of transition lining elements forms a transition between at least two non-parallel main lining elements having different thicknesses at their interfaces with the transition lining element, wherein said at least one transition lining element presents corresponding different thicknesses at the interfaces for providing smooth lining transitions at said interfaces. The different thicknesses may be advantageous as it allows forming a smooth surface of the lining also when using main lining elements of different thickness.

According to some embodiments, at least some of said plurality of transition lining elements comprise through holes arranged for allowing fastening of the at least one transition lining element to a surface of the haul truck body.

According to some embodiments, at least some of said plurality of transition lining elements comprise an elastic material, such as the elastic material is rubber or polyurethane.

According to some embodiments, the elastic material comprises rubber or polyurethane.

According to some embodiments, at least some of said plurality of transition lining elements comprise a structural element arranged to reinforce the transition lining element. The structural element may comprise a steel backing plate completely or partly embedded in the transition lining element. The structural element may be advantageous as it allows for increasing the structural integrity of the transition lining elements. Also, it may improve the fastening of the transition lining element to the haul truck body.

According to a second aspect, there is provided a lining for a haul truck body, said lining comprising:

- a plurality of main lining elements arranged to extend over main surfaces of said haul truck body, wherein said main surfaces comprises a bottom surface, a front surface and two opposite side surfaces, and wherein said plurality of main lining elements form at least a bottom lining extending over said bottom surface, and
- a plurality of transition lining elements arranged to extend over edge and/or corner portions of the haul truck body along the bottom lining,
- wherein each transition lining element forms a transition between the bottom lining and at least one of said side surfaces and said front surface of the haul truck body; and
- wherein said plurality of transition lining elements comprises at least one non-linear transition lining element which has a first and a second leg portion extending in non-parallel first and second leg directions, respectively, the first leg portion forming a first lining transition between a first pair of non-parallel main lining elements, and the second leg portion forming a second lining transition between a second pair of non-parallel main lining elements, and
- wherein three main lining elements of said first and said second pair of main lining elements are all non-parallel with each other.

The second aspect may be considered as an alternative solution to the above problem, the difference being that the transition lining elements form a lining transition between, on the one hand, the bottom lining and, on the other hand, at least one of a side surface and a front surface of the haul truck body, whereas, according to the first aspect, the transition lining elements form a lining transition between at least two non-parallel main lining elements. Thus, the lining according to the first and second aspects protect the same edge and corner portions and share common essential features. These two aspects may be combined. Furthermore, the inventive concept may be described in an alternative way: Each transition lining element may form a lining transition between at least two non-parallel main surfaces of the haul truck body. Main lining elements may extend over one or more of said non-parallel surfaces.

According to a third aspect there is provided a transition lining element for use in a lining for a haul truck body, said lining comprising a plurality of main lining elements which in use extend over surfaces of said haul truck body, wherein said transition lining element being arranged to form a lining transition between adjacent main lining elements of said lining; said transition lining element comprising:

- a main surface;
- a central portion;
- a first leg portion and a second leg portion which extend from the central portion in non-parallel first and second leg directions, respectively,
- said first leg portion presenting a first end surface which extends transversely of the first leg direction and connects to the main surface, and a first pair of non-parallel side surfaces which extend from the central portion to the first end surface and connect to the main surface, and
- said second leg portion presenting a second end surface which extends transversely of the second leg direction and connects to the main surface, and a second pair of non-parallel side surfaces which extend from the central portion to the second end surface and connect to the main surface; and
- said first and second end surfaces being arranged to connect to matching end surfaces of adjacent transition lining elements extending in said first and second leg direction, respectively, and each one of said non-parallel side surfaces being arranged to connect to matching surfaces of adjacent main lining elements,
- said first and second end surfaces being arranged to connect to matching end surfaces of adjacent transition lining elements extending in said first and second leg direction, respectively, and each one of said non-parallel side surfaces being arranged to connect to matching surfaces of adjacent main lining elements,
- said first leg portion being arranged to form a first lining transition in a first transition direction between a first pair of main lining elements connecting to said first pair of non-parallel side surfaces of the first leg portion, and
- said second leg portion being arranged to form a second lining transition in a second transition direction, different from said first transition direction, between a second pair of main lining elements connecting to said second pair of non-parallel side surfaces of the second leg portion. The transition lining element presents at least the following advantages:

When a transition lining element is disposed in a corner or along wedged edge portions of a haul truck body, the transition lining element may prevent or at least substantially reduce the occurrence of a gap in a lining close to the corner or wedged portion. This may reduce the risk of material present within the haul truck body to penetrate through a gap and thereby entering a space beneath the lining elements, which increases the risk of damage to the lining and increases the carry-back.

The non-linear transition lining element may be designed such as to fit in a corner portion or a wedged portion of a specific haul truck body. The use of such a transition lining element thus decreases the complexity of installing a lining to a haul truck body, as a single element may replace two or more separate conventional lining elements.

The use of transition lining elements allows for forming a uniform lining transition between main lining elements of different thicknesses. For example, transition lining elements may be used to form a smooth transition between a 15 cm thick lining on the bottom of the haul truck body to a 10 cm thick lining on a side wall of the haul truck body. Thus, the transition lining elements makes it possible to avoid forming recesses and/or edges within the lining where main lining elements of different thickness meet each other. Said recesses and/or edges are unwanted as they may result in material getting stuck, and subsequently penetrating through the gap between the main lining elements forming the recess and/or edge.

According to some embodiments, the first end surface of the first leg portion and the second end surface of the second leg portion have the same dimensions.

According to some embodiments, a cross section of the first leg portion is the same as a cross section of the second leg portion, said cross sections being defined orthogonally to the first and second leg directions, respectively.

According to some embodiments, the main surface is at least partly concave.

According to some embodiments, the non-parallel side surfaces of at least one of said first and second leg portions have mutually different widths transversely of the leg direction of the associated leg portion.

According to some embodiments, at least some of said non-parallel side surfaces connect to the main surface of the transition lining element at 90 degrees.

According to some embodiments, the transition lining element further comprises a third leg portion which extends from the central portion in a third leg direction, said third leg direction being non-parallel with a plane defined by the first and second leg directions; wherein the transition lining element is a corner lining element arranged to form a lining transition between a front lining, a side lining and a bottom lining portion; wherein:

said third leg portion presents a third end surface which extends transversely of the third leg direction and connects to the main surface, and a third pair of non-parallel side surfaces which extends from the central portion to the third end surface and connects to the main surface, said third end surface being arranged to connect to a matching end surface of an adjacent transition lining element extending in said third leg direction said third leg portion being arranged to form a third lining transition in a third transition direction, different from said first transition direction and said second transition direction, between a third pair of main lining elements connecting to said third pair of non-parallel side surfaces of the third leg portion.

The third leg portion may be advantageous as it allows for the corner lining element to protect the corner from all sides. In other words, there will be no gap in the lining providing a direct access for material to the corner. Furthermore, the corner lining element may be designed such as to avoid forming a gap close to an edge formed between different portions of the lining.

According to some embodiments of a corner lining element, the first leg direction, the second leg direction and the third leg direction form angles in relation to each other being within the angle interval 90-110 degrees. Larger angle intervals may be used dependent on the shape of the haul truck body.

According to some embodiments of a corner lining element, the main surface has a first planar surface which extends over the third leg portion and is aligned along the third leg direction.

According to some embodiments of a corner lining element, the main surface has a second planar surface which extends over the central portion and connects to said first planar surface.

According to some embodiments, the transition lining element is a wedge lining element arranged to form a lining transition between a front lining and two inclined bottom lining portions, wherein:

said first and second leg directions define a common plane; and a normal of one of the side surfaces of the first leg portion and a normal of one of the side surfaced of the second leg portion are parallel with said common plane.

The wedge lining element may be advantageous as it allows for protecting the wedge area from all sides. In other words, there will be no gap in the lining providing a direct access for material to the wedged area.

According to some embodiments of a wedge lining element, the transition lining element is a wedge lining element arranged to form a lining transition between a front lining and two inclined bottom lining portions; wherein:

a first side surface of said first leg portion connects to a first side surface of said second leg portion; and a second side surface of said first leg portion connects to a second side surface of said second leg portion.

According to some embodiments of a wedge lining element, the first leg direction and the second leg direction forms an obtuse angle with respect to each other. Said obtuse angle may be 150-170 degrees.

According to a fourth aspect there is provided a transition lining element for use in a lining for a haul truck body, said lining comprising a plurality of main lining elements which in use extend over surfaces of said haul truck body and present a thickness transversely to said surfaces, wherein said transition lining element being arranged to form a lining transition between adjacent main lining elements of said lining; said transition lining element extending along a longitudinal direction, said transition lining element comprising:

a main surface;

a first end surface and a second end surface disposed at opposing ends of the transition lining element, said first and second end surface extending transversely of the longitudinal direction and connecting to the main surface, a first and a second side surface which extend between the first and second end surfaces, respectively, on either side of the main surface and connecting to the main surface, wherein the first side surface is non-parallel with the second side surface, wherein said thickness of the transition lining element is larger at said first side surface than at the second side surface; and wherein, in use of the transition lining element, said first and second end surfaces being arranged to connect to matching end surfaces of adjacent transition lining elements extending in said longitudinal direction, and each one of said first and second side surfaces being arranged to connect to matching surfaces of adjacent main lining elements.

The transition lining element presents at least the following advantages:

When a transition lining element is disposed along edge portions of a haul truck body, the transition lining element may prevent or at least substantially reduce the occurrence of a gap in a lining close to the edge portion. This may reduce the risk of material present within the haul truck body to penetrate through a gap and thereby entering a space beneath the lining elements, which increases the risk of damage to the lining and increases the carry-back.

The transition lining element may be designed such as to fit in edge portions of a specific haul truck body. The use of such a transition lining element thus decreases the complexity of installing a lining to a haul truck body, as a single element may replace two or more separate conventional lining elements.

The use of transition lining elements allows for forming a uniform lining transition between main lining elements of different thicknesses. For example, transition lining elements may be used to form a smooth transition between a 15 cm thick lining on the bottom of the haul truck body to a 10 cm thick lining on a side wall of the haul truck body. Thus, the transition lining elements makes it possible to avoid forming recesses and/or edges within the lining where main lining elements of different thickness meet each other. Said recesses and/or edges are unwanted as they may result in material getting stuck, and subsequently penetrating through the gap between the main lining elements forming the recess and/or edge.

According to some embodiments, the main surface comprises a concave surface facing an interior of the haul truck body. The concave surface may be substantially cylindrical. The concave surface may be advantageous as is may prevent material to stick to the edges of the haul truck body, and thus aids in reducing the carry-back problem.

According to some embodiments, the transition lining element further comprises through holes arranged for allowing fastening of the transition lining element to a surface of the haul truck body.

According to some embodiments, the transition lining element comprises an elastic material.

According to some embodiments, the elastic material is rubber or polyurethane.

According to some embodiments, the transition lining element further comprises a structural element arranged to reinforce the transition lining element. The structural element may be advantageous as it allows for increasing the structural integrity of the transition lining elements. Also, it may improve the fastening of the transition lining element to the haul truck body.

According to some embodiments, the structural element comprises a steel backing plate completely or partly embedded in the transition lining element.

According to some embodiments, the transition lining element is an edge lining element arranged to form a lining transition between a front lining and a bottom lining portion or between a side lining and a bottom lining portion of the haul truck body.

According to a fifth aspect, there is provided a method for installing a lining for a haul truck body, said lining comprising a plurality of main lining elements arranged to extend over main surfaces of said haul truck body, and a plurality of transition lining elements arranged to extend over edge and corner portions of the haul truck body, the method comprising:

- positioning a pair of corner lining elements, forming part of said plurality of transition lining elements, at a respective front side corner of the haul truck body;
- positioning a wedge lining element, forming part of said plurality of transition lining elements, at a transition area between a front surface of the haul truck body and two mutually inclined bottom surface portions of the haul truck body;
- positioning one or more edge lining elements, forming part of said plurality of transition lining elements, between the corner lining elements and the wedge lining element, such as to form, together with the wedge lining element, a common transition between the pair of corner lining elements;
- positioning one or more edge lining elements, forming part of said plurality of transition lining elements, between the corner lining elements and rear ends of the haul truck body.

According to some embodiments, the method further comprises:

- positioning the plurality of main lining elements over main surfaces of the haul truck body, and
- fastening said plurality of main lining elements to the haul truck body,
- wherein said positioning of the plurality of main lining elements is performed, in total or in part, after positioning all the transition lining elements, such as to geometrically constrain the transition lining elements by said fastened plurality of main lining elements.

According to some embodiments, the method further comprises:

- fastening at least some transition lining elements of said plurality of transition lining elements to the haul truck body.

It is to be understood that two or more from the method steps may be performed in a different order with respect to each other than the order of which they are presented herein, if not explicitly disclosed otherwise.

According to a sixth aspect, there is provided a haul truck body comprising one from the list of:

- a lining according to the first or second aspects;
- one or more transition lining elements according to the third or fourth aspects.

According to a seventh aspect, there is provided a haul truck comprising the haul truck body according to the sixth aspect.

The above and other features of the inventive concept and preferred embodiments thereof are set out in the claims and will be described further in detail below.

Terminology

The term "linear element" should be understood as a body having a linear extension along one direction in space. The term non-linear element should thus be construed as a body having a non-linear extension along a non-linear path.

Other features and advantages of embodiments of the present invention will become apparent to those skilled in the art upon review of the following drawings, the detailed description, and the appended claims.

BRIEF DESCRIPTION OF THE DRAWINGS

The inventive concept, some non-limiting embodiments and further advantages of the inventive concept will now be further described with reference to the drawings.

FIG. 9A shows the haul truck body of FIG. 1, wherein two corner lining elements have been fastened.

FIG. 9B shows the haul truck body of FIG. 9A, wherein a wedge lining element have been added to the corner lining elements.

FIG. 9C shows the haul truck body of FIG. 9B, wherein a plurality of substantially horizontally aligned edge lining elements have been added to the corner lining elements and the wedge lining element.

FIG. 9D shows the haul truck body of FIG. 9C, wherein a plurality of substantially vertically aligned edge lining elements have been added to the corner lining elements, the wedge lining element and the plurality of substantially horizontally aligned edge lining elements.

FIG. 9E shows the haul truck body of FIG. 9D, wherein a plurality of main lining elements has been added to the transition lining elements.

DETAILED DESCRIPTION OF PREFERRED EMBODIMENTS

In the following detailed description, preferred embodiments of the lining and transition lining elements will be described in detail with reference to the appended drawings. Embodiments of the transition lining element of the disclosure is provided in FIGS. 2-5. The transition lining elements of the disclosure share common features. Some features are shared among all preferred embodiments of the transition lining element, whereas other features are shared by some of the embodiments. One distinguishing feature is if a transition lining element is linear or nonlinear. A linear transition lining element extends generally along one dimension. Such a transition lining element is the edge lining element 400 shown in FIG. 4A or the edge lining element 500 shown in FIG. 5A. A non-linear transition lining element extends generally along a non-linear path. Such a transition lining element is the wedge lining element 300 shown in FIG. 2A and the corner lining element 200 shown in FIG. 3A. In the following detailed description of preferred embodiments, each described exemplary embodiment will be referred to with its name. However, all exemplary embodiments are transition lining elements as defined in the claims. Therefore, this disclosure should not be limited to the specific form set forth herein. This disclosure is limited only by the appended claims and other embodiments than the mentioned hereinbelow are equally possible within the scope of the claims.

Figure 1:
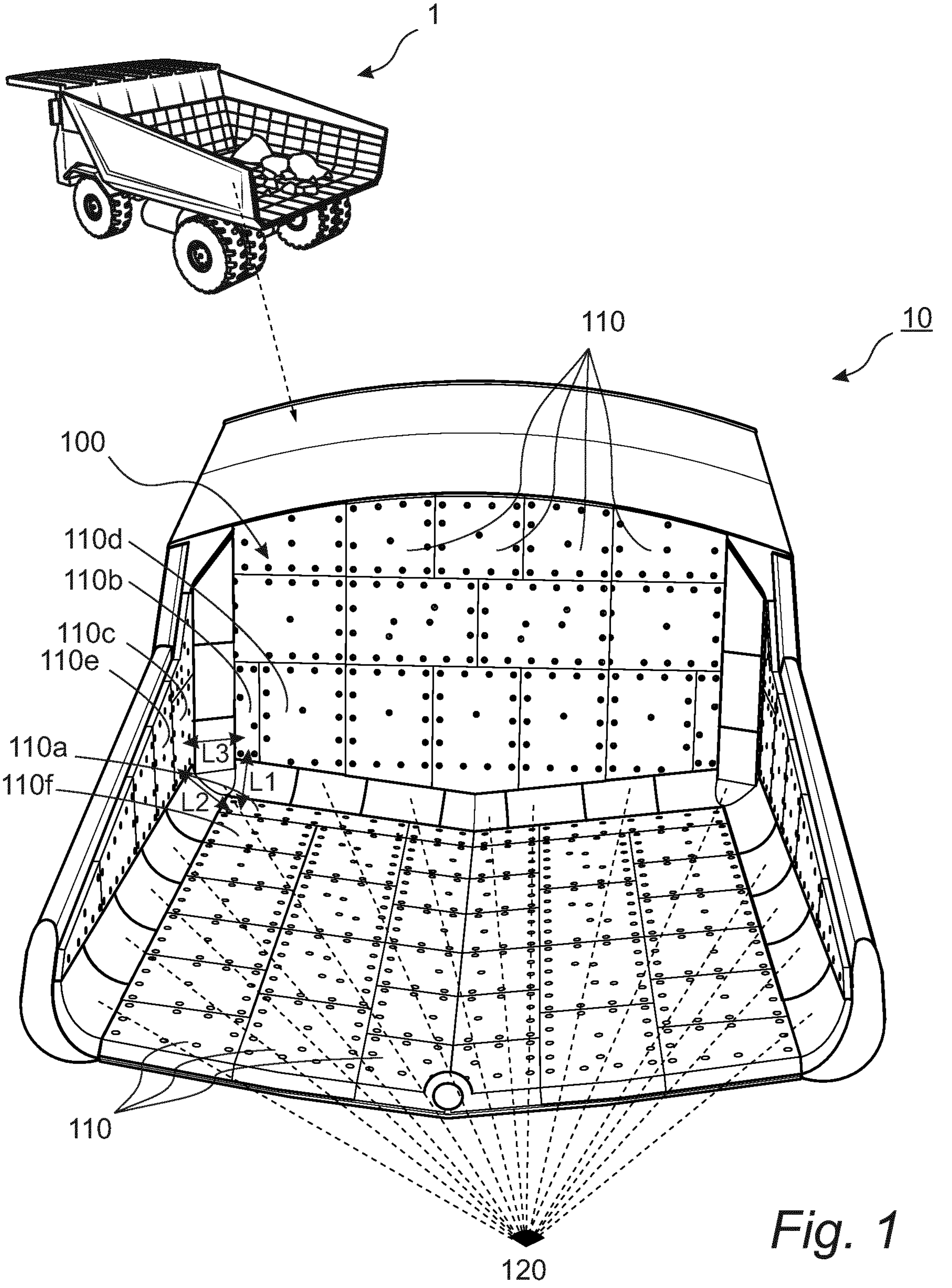
FIG. 1 is a perspective rear view of a haul truck body of a haul truck, wherein the haul truck body comprises a lining according to embodiments of the disclosure.

FIG. 1 shows a lining 100 for a haul truck body 10. The haul truck 1 is typically an off-highway dump truck engineered for use in high-production mining and heavy-duty construction environments. In use, the haul truck 1 will receive, in the haul truck body 10, a load of material, such as crushed stone, ore or the like, from another machine such as an excavator or a wheel loader. The haul truck 1 may then be used to move the load of material to other areas within a working area, for example to a processing facility such as a crusher. The haul truck 1 is arranged to swivel the haul truck body 10 around a pivot axis at the end of the haul truck 1, such that the load may be tipped off the haul truck body 10.

To protect the haul truck body 10 from damage due to the heavy material being hauled into, and tipped out from the haul truck body 10, surfaces of the haul truck body 10 is covered with a lining 100. As can be seen in FIG. 1, the lining 100 is arranged to extend over inner surfaces of the haul truck body 10.

Specifically, the lining 100 comprises a plurality of main lining elements 110 arranged to extend over main surfaces of the haul truck body 10. The lining 100 further comprises a plurality of transition lining elements 120 arranged to extend over edge and/or corner portions of the haul truck body 10. Each transition lining element 120 forms a lining transition between at least two non-parallel main lining elements 110 of the plurality of main lining elements 110. The plurality of transition lining elements 120 comprises at least one non-linear transition lining element 200,300 which has a first 211,311 and a second 212,312 leg portion extending in non-parallel first 221,321 and second 222,322 leg directions, respectively.

The main lining elements 110 form two opposite side linings **105*a*,105*b*, a front lining 105*c* and a bottom lining 105*d*,105*e*. The lining is thus divided into separate parts covering separate regions. The transition lining elements 120 are arranged to connect regions of main lining elements 110. The transition lining elements 120 are disposed at the edges and corners of the haul truck body 10. Thus, the transition lining elements 120 act as a frame forming transitions between adjacent sections of main lining elements 110**.

Figure 2:
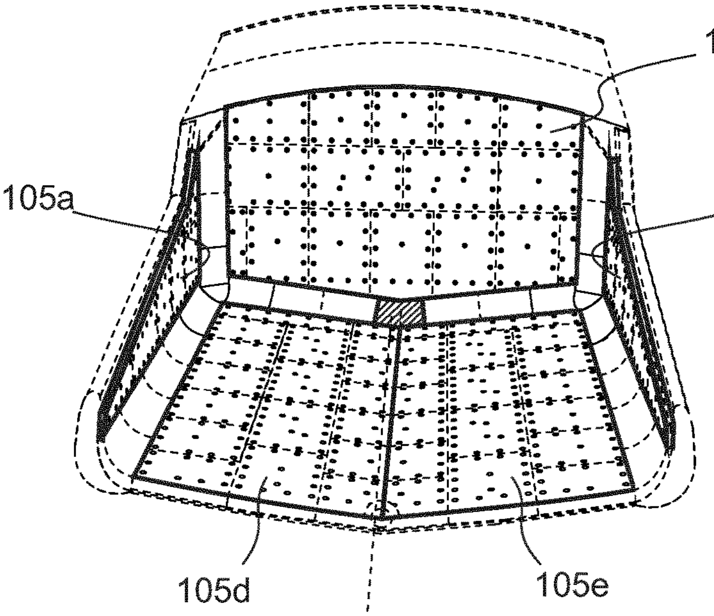
FIG. 2 shows the haul truck body of FIG. 1 highlighting a wedge lining element according to embodiments of the disclosure, wherein said wedge lining element is a transition lining element of the lining.
Figure 2A:
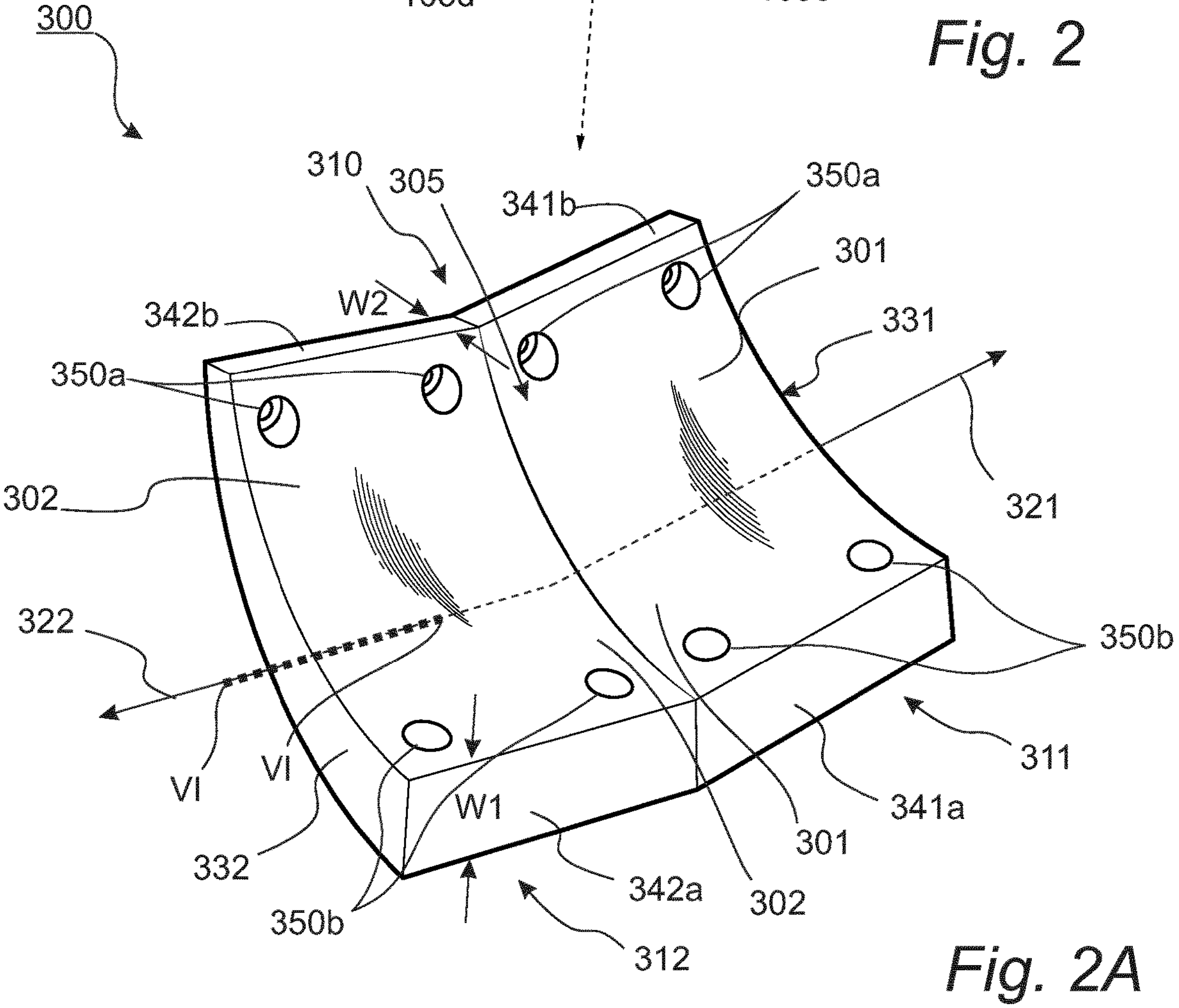
FIG. 2A is a perspective front view of the wedge lining element of FIG. 2.

One type of non-linear transition lining element is shown in FIGS. 2 and 2A illustrating a wedge lining element 300. FIG. 2 illustrates the wedge lining element 300 within the lining 100 of the haul truck body 10 whereas FIG. 2A presents an isolated view of the wedge lining element 300. The wedge lining element 300 is a non-linear transition lining element and thus has a first 311 and a second 312 leg portion extending in non-parallel first 321 and second 322 leg directions, respectively.

In the lining 100, main lining elements 110 form two opposite side linings **105*a*,105*b*, a front lining 105*c* and a bottom lining 105*d*,105*e*. The bottom lining 105*d*,105*e* presents non-parallel first 105*d* and second 105*e* mutually inclined bottom lining portions, and wherein the at least one non-linear transition lining element comprises a wedge lining element 300 forming a lining transition between three or more non-parallel main lining elements 110 which are located at a wedge area of the lining 100 and which form part of the front lining 105***c* and the two non-parallel bottom lining portions 105*d*,105*e*. The non-parallel first 321 and second 322 leg directions extend in a common plane parallel to the front lining 105*c*.

The wedge lining element 300 comprises a main surface 305. The main surface 305 is an outwardly directed surface facing the material carried by the haul truck body 10. The main surface 305 comprises a first main surface portion 301 and a second main surface portion 302. The first 301 and second 302 main surface portions connect to each other.

The wedge lining element 300 further comprises a central portion 310 and a first 311 and a second 312 leg portion which extend from the central portion 310 in non-parallel first 321 and second 322 leg directions, respectively.

The first leg portion 311 presents a first end surface 331 which extends transversely of the first leg direction 321 and connects to the main surface 305, and a first pair of non-parallel side surfaces 341*a*,341*b* which extend from the central portion 310 to the first end surface 321 and connect to the main surface 305.

The second leg portion 312 presents a second end surface 332 which extends transversely of the second leg direction 322 and connects to the main surface 305, and a second pair of non-parallel side surfaces 342*a*,342*b* which extend from the central portion 310 to the second end surface 332 and connect to the main surface 305.

The first main surface portion 301 and the second main surface portion 302 present concave surfaces facing an interior of the haul truck body 10. The concave surfaces may be substantially cylindrical along a respective main surface portion. The concave surfaces may prevent material to stick to the edges of the haul truck body 10, and thus aids in reducing the carry-back problem.

The wedge lining element 300 forms a transition between three or more non-parallel main lining elements having different thicknesses at their interfaces with the transition lining element. Specifically, the lining transition is formed between a front lining 105*c* and two inclined bottom lining portions 105*a*,105*b*. The first 321 and second 322 leg directions define a common plane and a normal of one of the side surfaces 341*b* of the first leg portion 311 and a normal of one of the side surfaces 342*b* of the second leg portion 312 are parallel with the common plane.

Thus, the wedge lining element 300 presents corresponding different thicknesses at the interfaces for providing smooth lining transitions at the interfaces. The interfaces of the wedge lining element 300 corresponds to the non-parallel side surfaces 341*a*,341*b*,342*a*,342*b*.

As apparent from FIG. 2A, the non-parallel side surfaces 341*a*,341*b* of the first leg portion 311 and the non-parallel side surfaces 342*a*,342*b* of the second leg portion 312 connect to the main surface 305 of the transition lining element at 90 degrees.

Thus, in use of the transition lining element 300, the first 331 and second 332 end surfaces are arranged to connect to matching end surfaces of adjacent transition lining elements 120 extending in the first 321 and second 322 leg direction, respectively. Such an adjacent transition lining element 120 is the edge lining element 400 shown in FIG. 4A. Each one of the non-parallel side surfaces 341*a*,341*b*,342*a*,342*b* is arranged to connect to matching surfaces of adjacent main lining elements 110.

In order to match adjacent transition lining elements 120, the wedge lining element 300 is designed such as to allow certain symmetry. Thus, the first end surface 331 of the first leg portion 311 and the second end surface 332 of the second leg portion 312 have the same dimensions. Furthermore, a cross section of the first leg portion 311 is the same as a cross section of the second leg portion 312, the cross sections being defined orthogonally to the first 321 and second leg directions 322, respectively.

The non-parallel side surfaces of at least one of the first 311 and second 312 leg portions have mutually different widths W1, W2 transversely of the leg direction of the associated leg portion. Thus, the wedge lining element 300 is suitable for forming a smooth transition between main lining elements 110 of a first thickness W1 used on the two inclined bottom lining portions 105*a*,105*b* and main lining elements of a second thickness W2 used on the front lining 105*c* and the two opposed side linings 105*a*,105*b*.

A first side surface 341*a* of the first leg portion 311 connects to a first side surface 342*a* of the second leg portion 312; and a second side surface 341*b* of the first leg portion 311 connects to a second side surface 342*b* of the second leg portion 312.

The first leg direction 321 and the second leg direction 322 form an obtuse angle with respect to each other. In the example embodiment, the obtuse angle is 160 degrees.

The wedge lining element 300 further comprises through holes 350*a*,350*b* arranged for allowing fastening of the wedge lining element 300 to a surface of the haul truck body 10. The fastening is achieved by using through bolts or an alternative fastening device penetrating through the through holes 350*a*,350*b* of the wedge lining element 300 extending further into matching through holes of the haul truck body 10. There are two rows of through holes, a bottom row 350*b* arranged for fastening the wedge lining element 300 to a bottom surface of the haul truck body 10 and a top row 350*a* arranged for fastening the wedge lining element 300 to a side surface of the haul truck body 10.

The wedge lining element 300 comprises an elastic material. In the example embodiment, the wedge lining element 300 comprises rubber. Alternatively, polyurethane may be used.

The wedge lining element 300 further comprises a structural element 160 arranged to reinforce the wedge lining element 300. This is illustrated in FIG. 6A-D showing cross sectional profiles, as viewed along a line VI-VI shown in FIG. 2A, of the wedge lining element 300 according to four exemplary embodiments. The structural element 160 is a steel backing plate completely or partly embedded in the transition lining element. In the embodiment, the steel backing plate is embedded inside the wedge lining element 300 by vulcanizing it into the rubber.

Figure 7A:
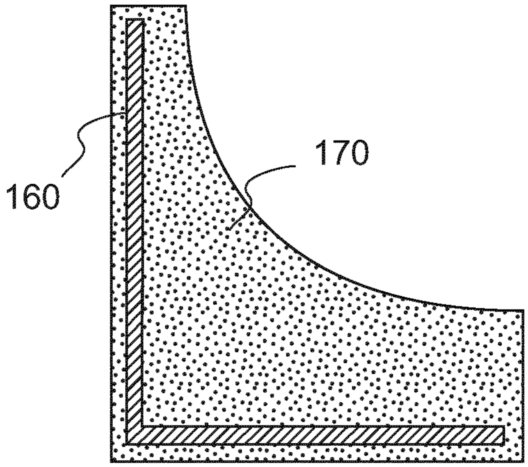
FIG. 7A-D are cross sectional views along a line VI-VI (see FIGS. 2A, 3A and 4A) of a portion of transition lining elements according to various alternative exemplary embodiments of the disclosure.
Figure 7B:
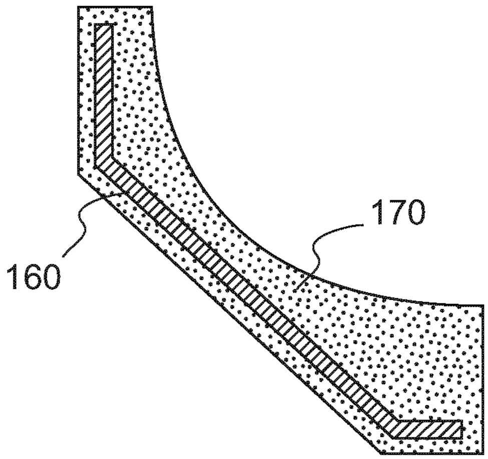
Figure 7C:
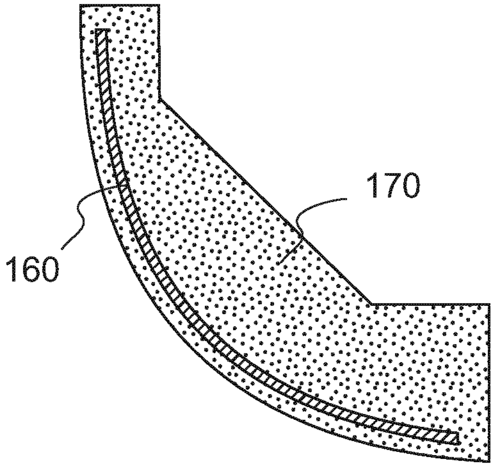
Figure 7D:
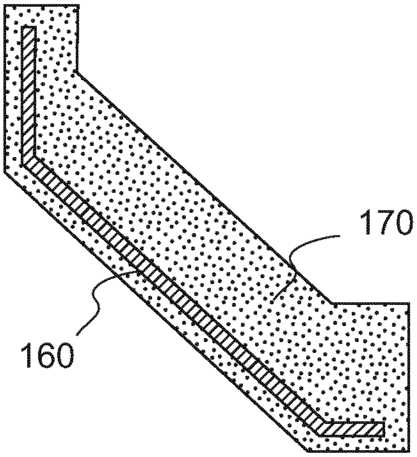

FIG. 7A-D shows alternative cross sectional profiles of a wedge lining element according to alternative exemplary embodiments. FIG. 7A shows an embodiment suitable for fastening on a haul truck body with sharp edges. FIGS. 7B and 7D shows embodiments suitable for fastening on a haul truck body with 45 degree wedged edges. FIGS. 7C and 7D shows embodiments where the main surface has sharp edges instead of a rounded concave shape.

Figure 3:
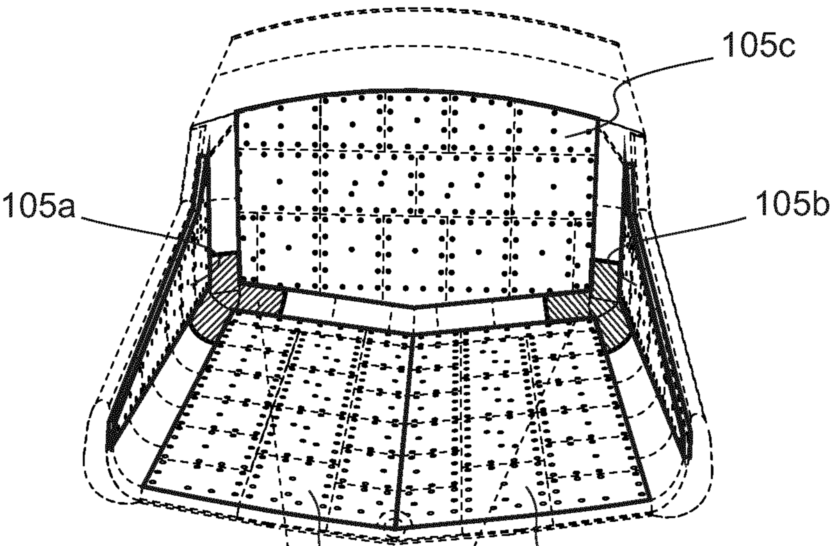
FIG. 3 shows the haul truck body of FIG. 1 highlighting two corner lining elements according to embodiments of the disclosure, wherein said corner lining elements are transition lining elements of the lining.

Another type of non-linear transition lining element is a corner lining element. FIG. 3 illustrates the corner lining element 200 within the lining 100 of the haul truck body 10 whereas FIGS. 3A and B presents isolated views of the corner lining element 200. As illustrated in FIG. 2, the corner lining element 200 forms a lining transition between three non-parallel main lining elements 110 located at a corner of the lining 100 and forming part of the one of the two opposite side linings 105*a*,105*b*, the front lining 105*c* and the bottom lining 105*d*,105*e*, respectively.

The corner lining element 200 is a non-linear transition lining element and thus has a first 211 and a second 212 leg portion extending in non-parallel first 221 and second 222 leg directions, respectively. In addition, the corner lining element 200 further presents a third leg portion 213 extending in a third leg direction 223 different from the first 221 and second 222 leg directions. Thus, each one of the first 211, second 212 and third 213 leg portions extends from the corner to an adjacent transition lining element 120 of the plurality of transition lining elements 120.

The corner lining element 200 comprises a main surface 205. The main surface 205 is an outwardly directed surface facing the material carried by the haul truck body. The main surface 205 comprises a first main surface portion 201, a second main surface portion 202 and a third main surface portion 203. The first main surface portion 201 and the second main surface portion 202 present concave surfaces facing an interior of the haul truck body. The concave surfaces may be substantially cylindrical along a respective main surface portion. The concave surface may prevent material to stick to the edges of the haul truck body 10, and thus aids in reducing the carry-back problem.

The main surface 205 has a first planar surface 203, being the third main surface portion 203, which extends over the third leg portion 213 and is aligned along the third leg direction 223.

The main surface 205 has a second planar surface 204 which extends over the central portion 210 and connects to the first planar surface 203. The second planar surface 204 is arranged in an angled position such as to prevent forming a sharp corner on the main surface 205, within which material have a risk of getting stuck during use of the haul truck body 10.

In other words, the corner lining element 200 comprises a central portion 210 and a first 211 and a second 212 leg portion which extend from the central portion 210 in non-parallel first 221 and second 222 leg directions, respectively. The corner lining element 200 further comprises a third leg portion 213 which extends from the central portion 210 in a third leg direction 223, the third leg direction 223 being non-parallel with a plane defined by the first 221 and second 222 leg directions.

The corner lining element 200 is arranged to form a lining transition between a front lining 105*c*, a side lining 105*a*; 105*b* and a bottom lining portion 105*d*; 105*e*.

Figure 3A:
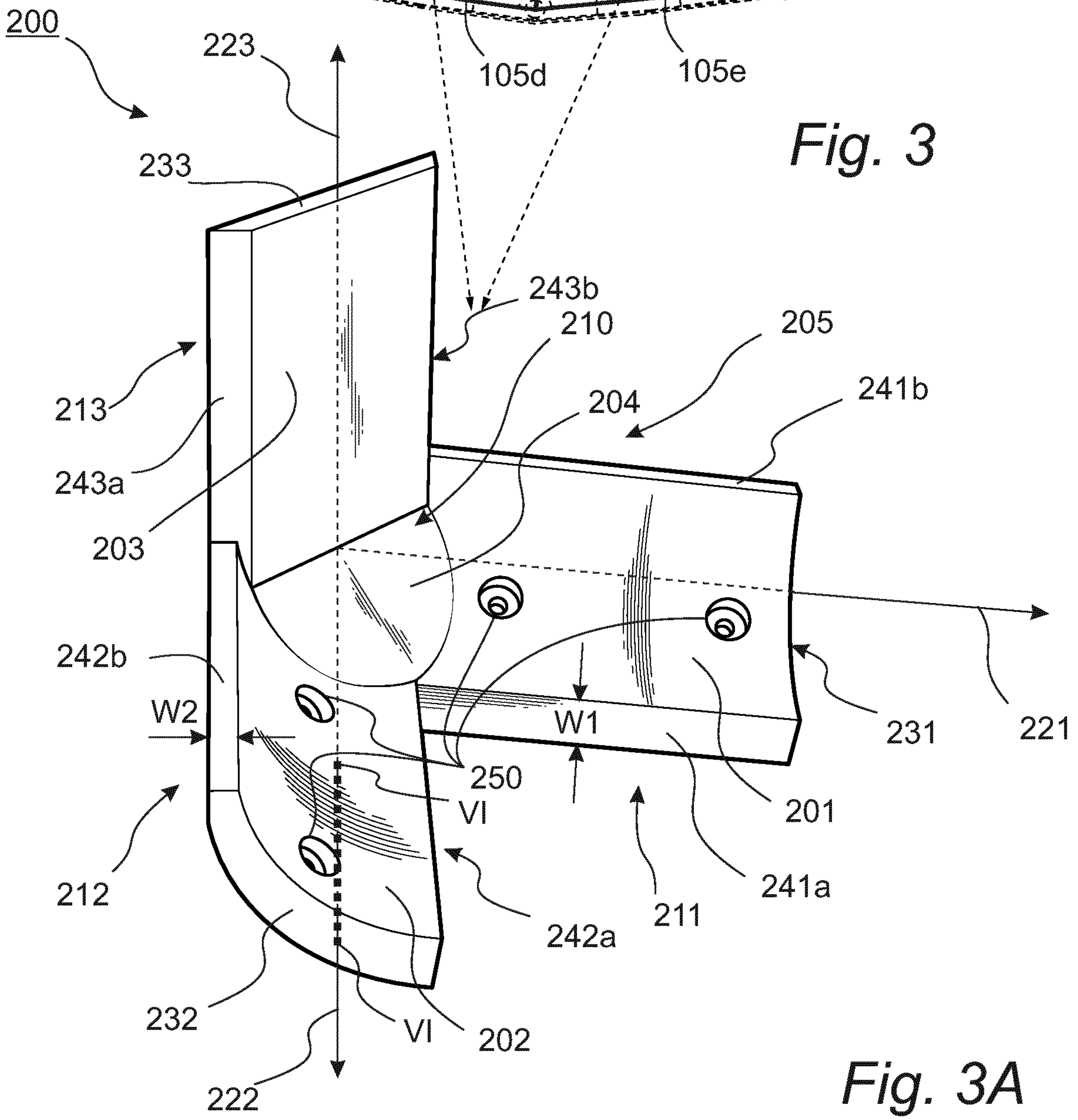
FIG. 3A is a perspective front view of one of the corner lining elements of FIG. 3.
Figure 3B:
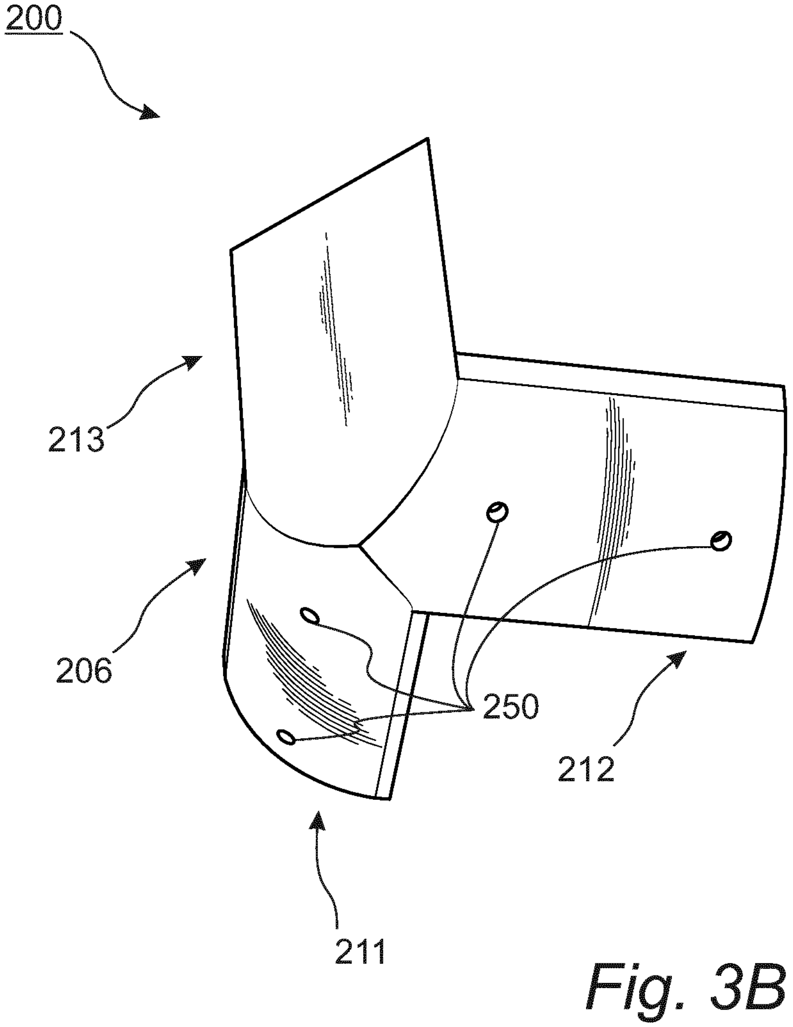
FIG. 3B is a perspective back view of the corner lining element shown in FIG. 3A.

As illustrated in FIGS. 3A and B, the three leg portions 211,212,213 meet one another and join at the central portion 210.

In other words, the first leg portion 211 presents a first end surface 231 which extends transversely of the first leg direction 221 and connects to the main surface 205, and a first pair of non-parallel side surfaces 241*a*,241*b* which extend from the central portion 210 to the first end surface 221 and connect to the main surface 205.

Similarly, the second leg portion 212 presents a second end surface 232 which extends transversely of the second leg direction 222 and connects to the main surface 205, and a second pair of non-parallel side surfaces 242*a*,242*b* which extend from the central portion 210 to the second end surface 232 and connect to the main surface 205.

Similarly, the third leg portion 213 presents a third end surface 233 which extends transversely of the third leg direction 223 and connects to the main surface 205, and a pair of non-parallel side surfaces 243*a*,243*b* which extends from the central portion 210 to the third end surface 233 and connects to the main surface 205.

As apparent from FIG. 3A, the non-parallel side surfaces 241*a*,241*b* of the first leg portion 211 and the non-parallel side surfaces 242*a*,242*b* of the second leg portion 212 connect to the main surface 205 of the transition lining element at 90 degrees.

Figure 10:
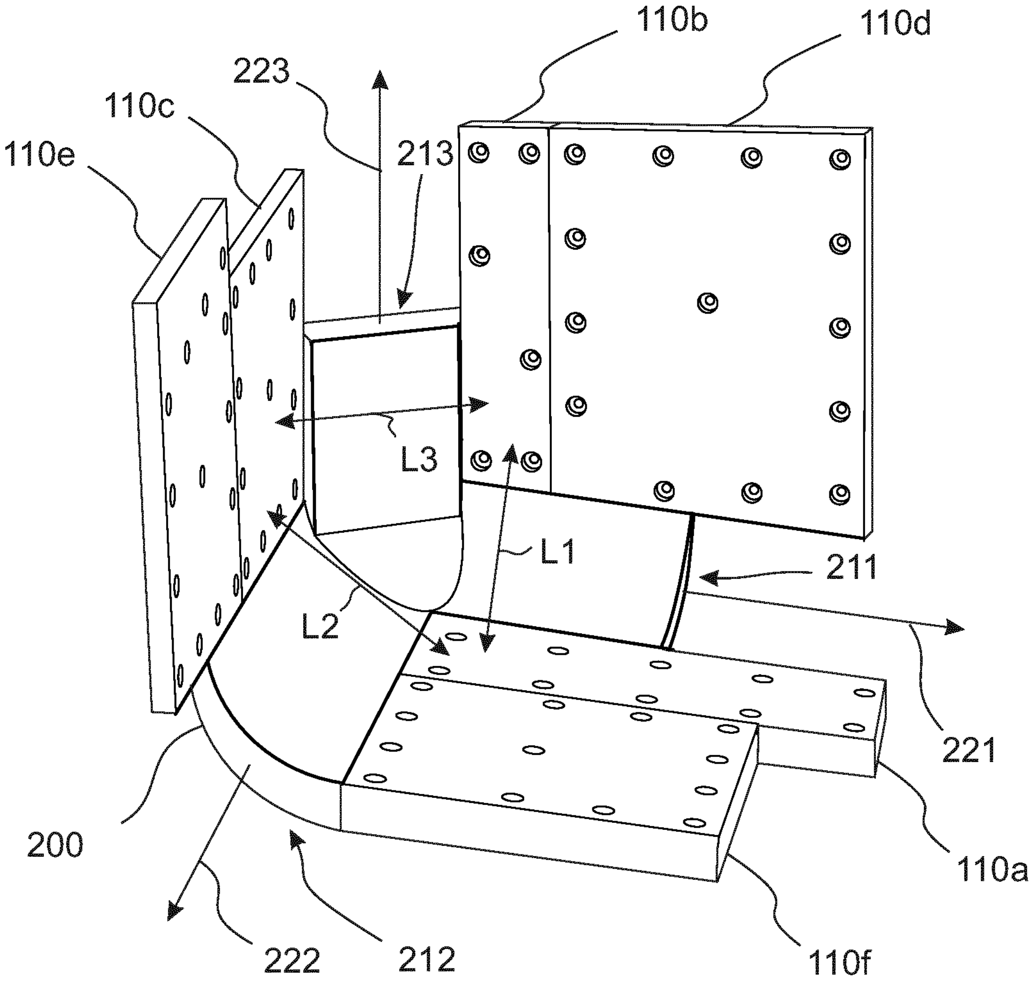
FIG. 10 shows an isolated view of one of the non-linear transition lining elements, a corner lining element, and adjacent main lining elements shown in FIG. 1.

Each one of the nonlinear transition lining elements, such as the corner lining elements 200 and the wedge lining element 300, is structured so as to form at least two lining transitions between at least three non-parallel main lining elements. This is further illustrated in FIG. 1 for the corner element 200 and the adjacent main lining elements 110*a-f*. To increase clarity, FIG. 10 illustrates the same lining elements in an isolated and enlarged view. As can be seen in FIGS. 1 and 10, the first leg portion 211 forms a first lining transition L1 between a first pair 110*a*,110*b* of non-parallel main lining elements. Similarly, the second leg portion 212 forms a second lining transition L2 between a second pair 110*a*,110*c* of non-parallel main lining elements. Three main lining elements 110*a-c* of the first pair 110*a*,110*b* and the second pair 110*a*,110*c* of main lining elements are all non-parallel to each other. As readily realized by the skilled person, the wedge element 300 shows the same characteristics. However, the corner lining element 200 in FIGS. 1 and 10 further comprises a third leg portion 213. Thus, similarly, the third leg portion 213 forms a third lining transition L3 between a third pair 110*b*,110*c* of non-parallel main lining elements. For the corner lining element 200, the three main lining elements 110*a-c* of the first 110*a*,110*b*, second 110*a*,110*c* and third pairs 110*b*,110*c* of main lining elements are all non-parallel with each other. This implies that each of said pairs of main lining elements may share one or more specific main lining elements.

In use of the transition lining element 200, the first 231 and second 232 end surfaces are arranged to connect to matching end surfaces of adjacent transition lining elements 120 extending in the first 221 and second 222 leg direction, respectively. Such an adjacent transition lining element 120 is the edge lining element 400 shown in FIG. 4A. Each one of the non-parallel side surfaces 241*a*,241*b*,242*a*,242*b* is arranged to connect to matching surfaces of adjacent main lining elements 110. The third end surface 233 is arranged to connect to a matching end surface of an adjacent transition lining element 120 extending in the third leg direction 223. Such an adjacent transition lining element 120 is the edge lining element 500 shown in FIG. 5A.

In order to match adjacent transition lining elements 120, the corner lining element 200 is designed such as to allow certain symmetry. Thus, the first end surface 231 of the first leg portion 211 and the second end surface 232 of the second leg portion 212 have the same dimensions. Furthermore, a cross section of the first leg portion 211 is the same as a cross section of the second leg portion 212, the cross sections being defined orthogonally to the first 221 and second leg directions 222, respectively.

The non-parallel side surfaces of at least one of the first 211 and second 212 leg portions have mutually different widths W1,W2 transversely of the leg direction of the associated leg portion. Thus, the corner lining element 200 is suitable for forming a smooth transition between main lining elements 110 of a first thickness W1 used on the two inclined bottom lining portions 105*a*,105*b* and main lining elements of a second thickness W2 used on the front lining 105*c* and the two opposed side linings 105*a*,105*b*.

The first leg direction 221, the second leg direction 222 and the third leg direction 223 form angles in relation to each other being within the angle interval 90-110 degrees.

The corner lining element 200 comprises through holes 250 arranged for allowing fastening of the corner lining element 200 to a surface of the haul truck body 10. The fastening is achieved by using through bolts or an alternative fastening device penetrating through the through holes 250 of the corner lining element 200 extending further into matching through holes of the haul truck body 10.

The corner lining element 200 comprises an elastic material. In the example embodiment, the corner lining element 200 comprises rubber. Alternatively, polyurethane may be used.

The corner lining element 200 further comprises a structural element 160 arranged to reinforce the corner lining element 200. This is illustrated in FIG. 6A-D showing cross sectional profiles, as viewed along a line VI-VI shown in FIG. 2A, of the second leg portion 212 of the corner lining element 200 according to four exemplary embodiments. The structural element 160 is a steel backing plate completely or partly embedded in the corner lining element 200. In the embodiment, the steel backing plate is embedded inside the corner lining element 200 by vulcanizing it into the rubber.

FIG. 7A-D shows alternative cross sectional profiles of the second leg portion 212 of a corner lining element according to alternative exemplary embodiments. FIG. 7A shows an embodiment suitable for fastening on a haul truck body with sharp edges. FIGS. 7B and 7D shows embodiments suitable for fastening on a haul truck body with 45 degree wedged edges. FIGS. 7C and 7D shows embodiments where the main surface has sharp edges instead of a rounded concave shape.

Figure 4:
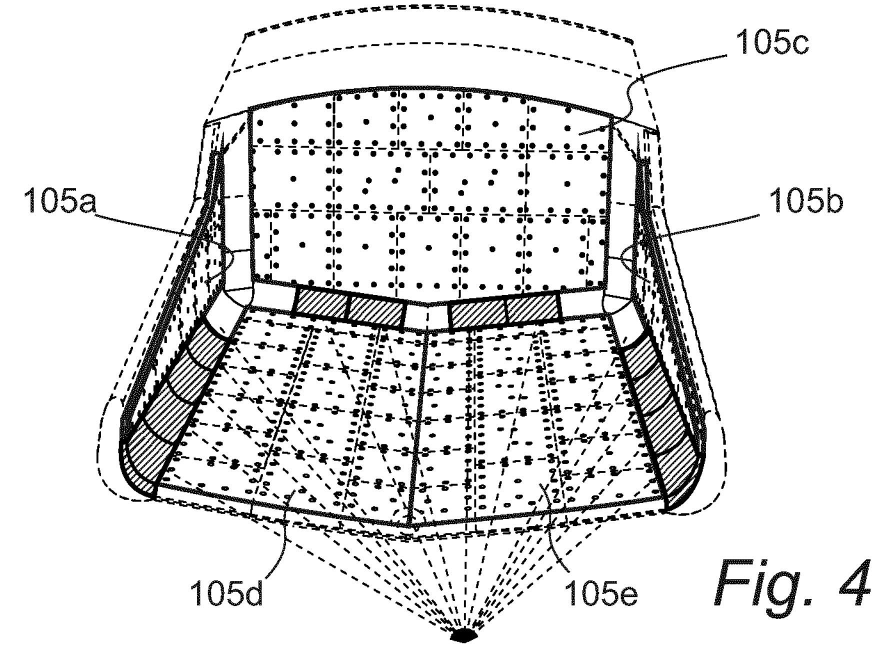
FIG. 4 shows the haul truck body of FIG. 1 highlighting edge lining elements according to embodiments of the disclosure, wherein said edge lining elements are transition lining elements of the lining.
Figure 4A:
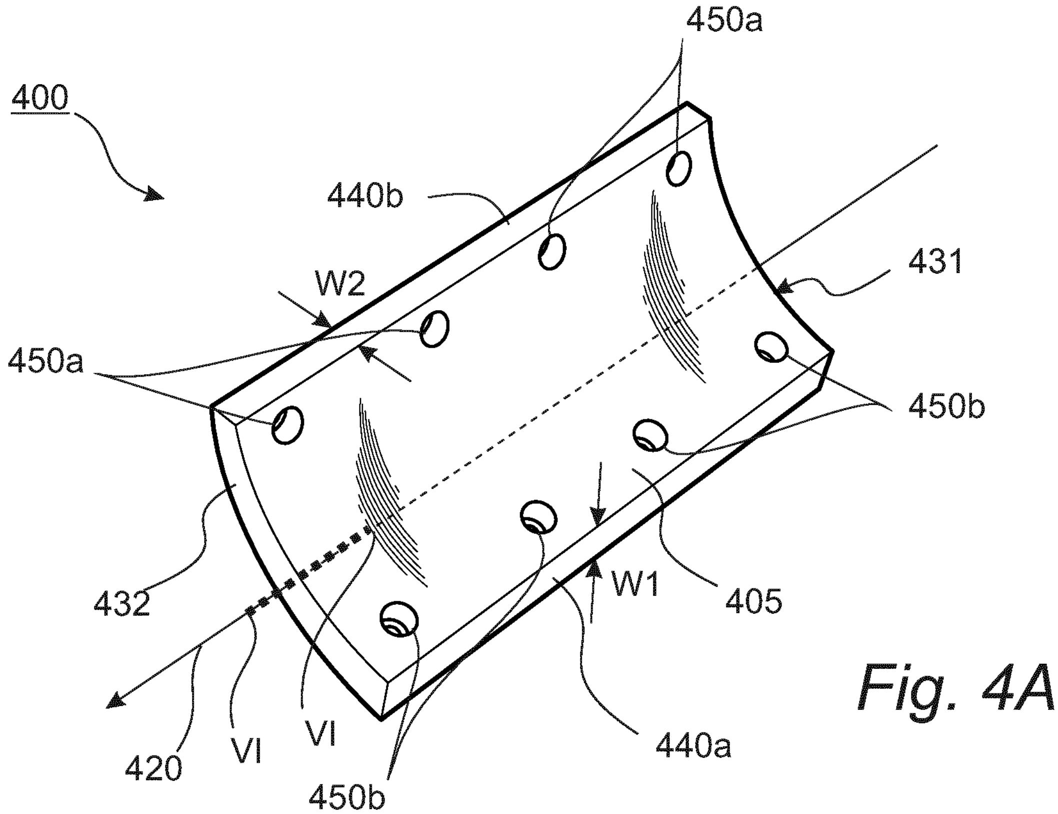
FIG. 4A is a perspective front view of one of the edge lining elements of FIG. 4.

Another type of transition lining element 120 is a linear transition lining element. One type of such a linear transition lining element is shown in FIGS. 4 and 4A illustrating an edge lining element 400. FIG. 4 illustrates the edge lining element 400 within the lining 100 of the haul truck body 10 whereas FIG. 4A presents an isolated view of the edge lining element 400.

The edge lining element 400 is intended for use in a lining 100 for a haul truck body 10. The lining 100 comprising a plurality of main lining elements 110 which in use extend over surfaces of the haul truck body 10 and present a thickness transversely to the surface. The edge lining element 400 is arranged to form a lining transition between adjacent main lining elements 110 of the lining 100. The edge lining element 400 extends along a longitudinal direction 420.

The edge lining element 400 comprises a main surface 405. The main surface 405 comprises a concave surface facing an interior of the haul truck body 10. The concave surface may be substantially cylindrical. The concave surface may prevent material to stick to the edges of the haul truck body 10, and thus aids in reducing the carry-back problem.

The edge lining element 400 further comprises a first 431 and a second 432 end surface disposed at opposing ends of the edge lining element 400. The first 431 and second 432 end surface extends transversely of the longitudinal direction 420 and connect to the main surface 405.

The edge lining element 400 further comprises a first 440*a* and a second 440*b* side surface which extend between the first 431 and second 432 end surfaces, respectively, on either side of the main surface 405 and connecting to the main surface 405. The first side surface 440*a* is non-parallel with the second side surface 440*b*. The thickness of the transition lining element is larger W1 at the first side surface 440*a* than at W2 the second side surface 440*b*. In other words, the non-parallel side surfaces 440*a*,440*b* have mutually different widths W1,W2 transversely of the longitudinal direction.

In use of the edge lining element 400, the first 431 and second 432 end surfaces are arranged to connect to matching end surfaces of adjacent transition lining elements 120 extending in the longitudinal direction 420, and each one of the first and second side surfaces being arranged to connect to matching surfaces of adjacent main lining elements 110. In other words, the edge lining element 400 is arranged to form a lining transition between a front lining 105*c* and a bottom lining portion 105*d*,105*e* or between a side lining 105*a*,105*b* and a bottom lining portion 105*d*,105*e*.

The different thickness of the edge lining element 400 at the first side surface 440*a* and the second side surface 440*b* makes the edge lining element 400 suitable for forming a smooth transition between main lining elements 110 of a first thickness W1 used on the two inclined bottom lining portions 105*a*,105*b* and main lining elements of a second thickness W2 used on the front lining 105*c* and the two opposed side linings 105*a*,105*b*.

The edge lining element 400 further comprises through holes 450*a*,450*b* arranged for allowing fastening of the edge lining element 400 to a surface of the haul truck body 10. The fastening is achieved by using through bolts or an alternative fastening device penetrating through the through holes 450*a*,450*b* of the edge lining element 400 extending further into matching through holes of the haul truck body 10. There are two rows of through holes, a bottom row 450*b* arranged for fastening the wedge lining element 400 to a bottom surface of the haul truck body 10 and a top row 450*a* arranged for fastening the wedge lining element 400 to a side surface of the haul truck body 10.

The edge lining element 400 comprises an elastic material. In the embodiment, the elastic material is rubber. Alternatively, the elastic material may be polyurethane.

The edge lining element 400 further comprises a structural element 160 arranged to reinforce the edge lining element 400. This is illustrated in FIG. 6A-D showing cross sectional profiles, as viewed along a line VI-VI shown in FIG. 4A, of the edge lining element 400 according to four exemplary embodiments. The structural element 160 is a steel backing plate completely or partly embedded in the edge lining element. In the embodiment, the steel backing plate is embedded inside the edge lining element 400 by vulcanizing it into the rubber.

FIG. 7A-D shows alternative cross sectional profiles of an edge lining element according to alternative exemplary embodiments. FIG. 7A shows an embodiment suitable for fastening on a haul truck body with sharp edges. FIGS. 7B and 7D shows embodiments suitable for fastening on a haul truck body with ~45 degree wedged edges. FIGS. 7C and 7D shows embodiments where the main surface has sharp edges instead of a rounded concave shape.

Figure 5:
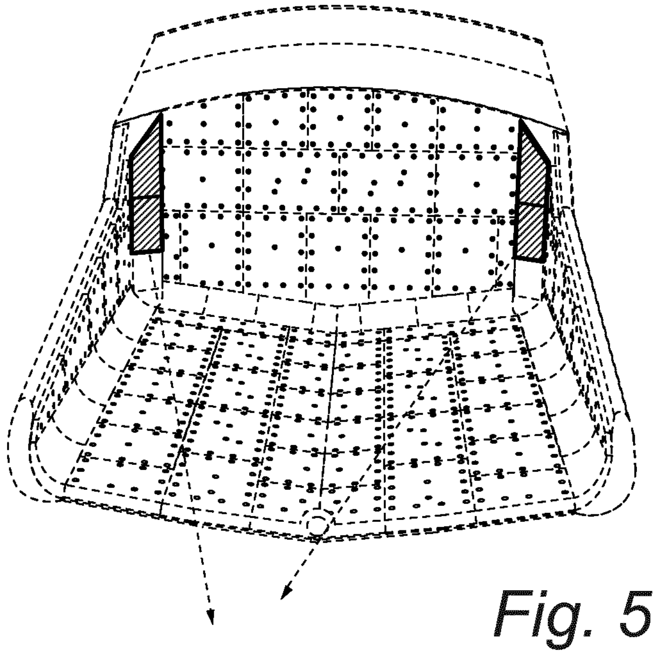
FIG. 5 shows the haul truck body of FIG. 1 highlighting edge lining elements according to alternative embodiments of the disclosure, wherein said edge lining elements are transition lining elements of the lining.
Figure 5A:
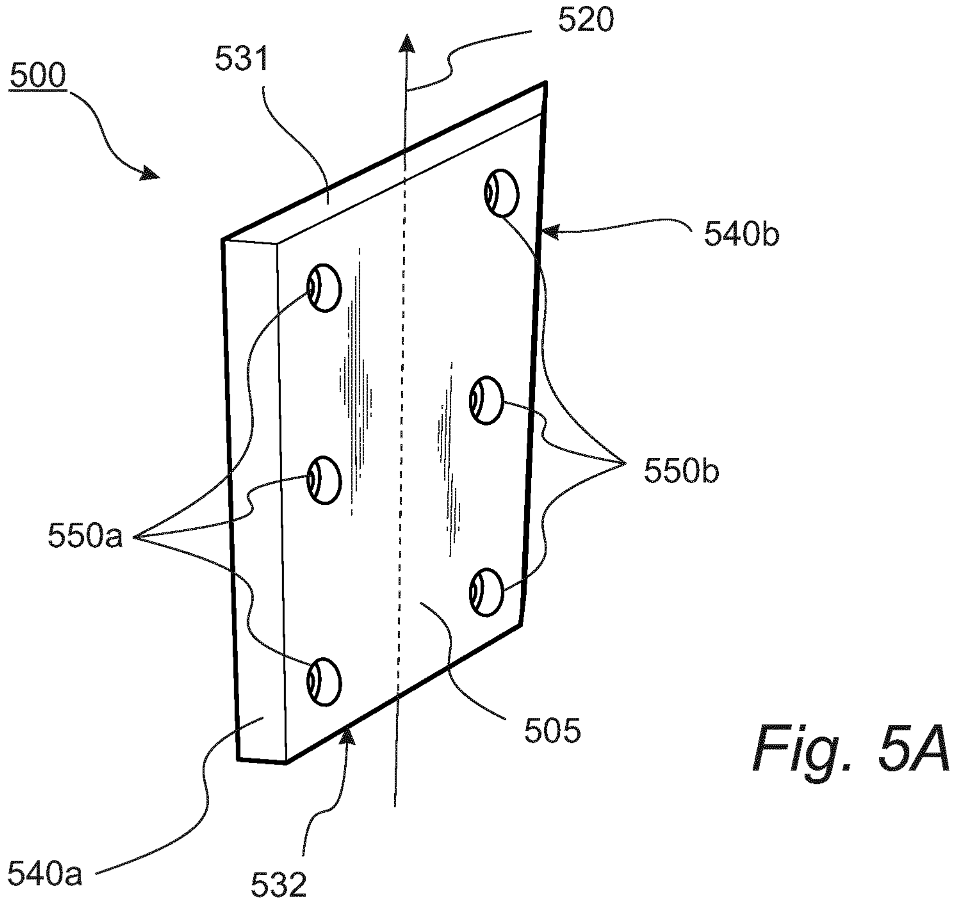
FIG. 5A is a perspective front view of one of the edge lining elements of FIG. 5.
Figure 6A:
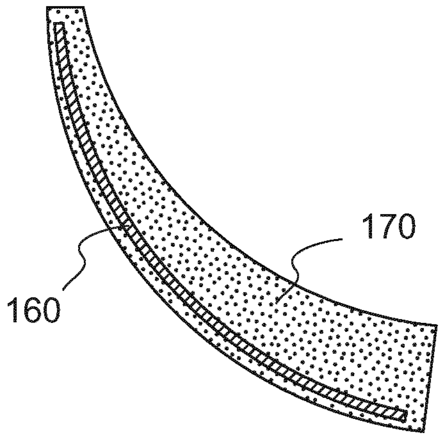
FIG. 6A-D are cross sectional views along a line VI-VI (see FIGS. 2A, 3A and 4A) of a portion of transition lining elements according to various exemplary embodiments of the disclosure.
Figure 6B:
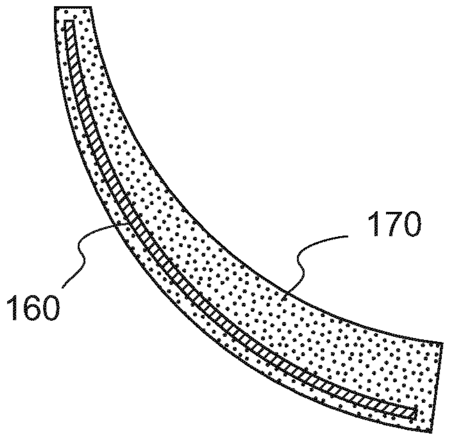
Figure 6C:
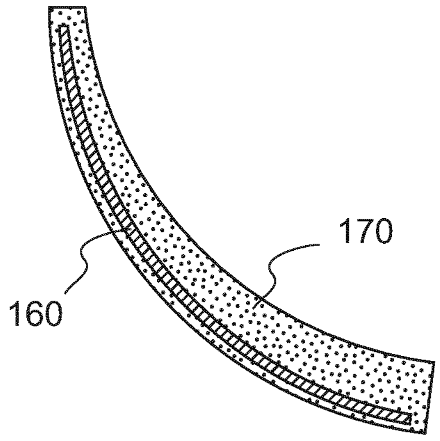
Figure 6D:
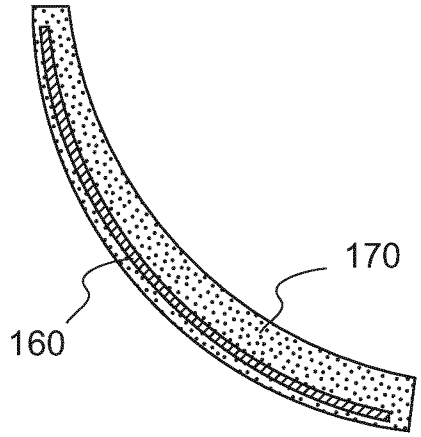

Another type of linear transition lining element is shown in FIGS. 5 and 5A illustrating a planar edge lining element 500. FIG. 5 illustrates the planar edge lining element 500 within the lining 100 of the haul truck body 10 whereas FIG. 5A presents an isolated view of the planar edge lining element 500.

The planar edge lining element 500 is similar to the edge lining element 400, but differs from the edge lining element 400 in that it is substantially planar. Another difference is that the non-parallel side surfaces 540*a*,540*b* forms oblique angles with the main surface 505. For the embodiment, the oblique angles are ~45 degrees.

Figure 8:
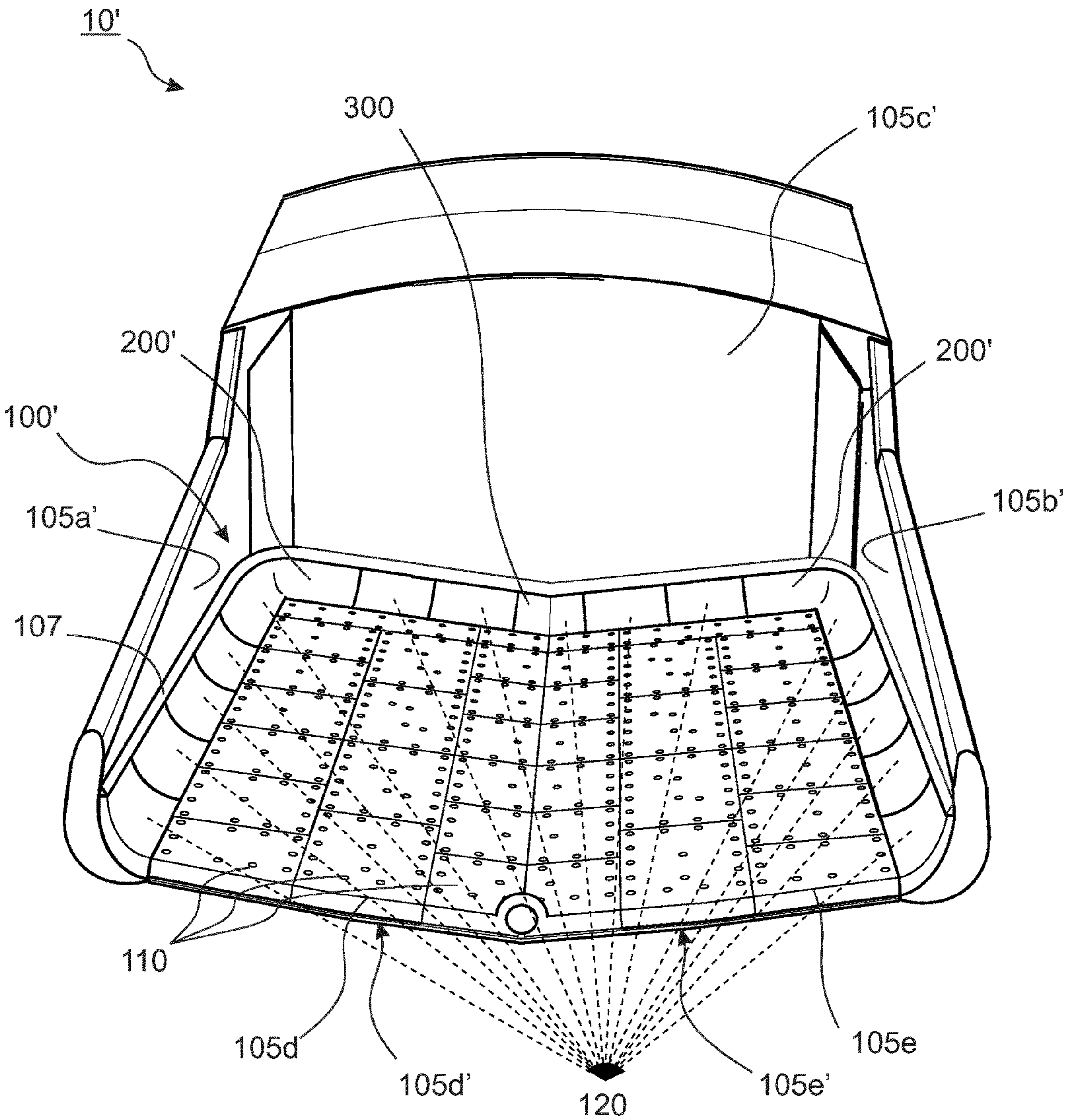
FIG. 8 is a perspective rear view of a haul truck body provided with a lining according to alternative embodiments.

The transition lining elements 120 of the disclosure may be used also without one or more side linings. In such embodiments, at least some of the transition lining elements form a lining transition between a bottom lining and at least one side surface of the haul truck body 10'. In other words, a transition lining element 120, such as a corner lining element, actually does not have to constitute a transition lining element 120 between two different main lining elements 110. This is illustrated in FIG. 8 which shows an alternative lining 100' for a haul truck body 10'.

The lining 100' comprises a plurality of main lining elements 110 arranged to extend over main surfaces of said haul truck body 10'. The main surfaces comprise a bottom surface **105*d'*,105*e'*, opposite side surfaces 105*a'*,105*b'* and a front surface 105*c'*. The plurality of main lining elements 110 form at least a bottom lining 105*d*,105*e* extending over said bottom surface 105*d'*,105*e'*. In the example, the plurality of main lining elements 110 forms the bottom lining 105*d*,105*e***.

The lining 100' further comprises a plurality of transition lining elements 120 arranged to extend over edge and/or corner portions of the haul truck body 10' along the bottom lining **105*d*,105*e*. As can be seen in FIG. 8, each transition lining element 120 forms a lining transition between the bottom lining 105*d*,105*e* and at least one of said side surfaces 105*a*,105*b* and said front surface 105*c* of the haul truck body 10'**.

As illustrated in the example, the haul truck body 10' may have a protecting edge 107 extending along the side surfaces **105*a'*,105*b'* and the front surface 105*c'* such as to protect exposed sides of the plurality of transition lining elements 120 from being damaged by the material loaded into the haul truck body 10'. The plurality of transition lining elements 120 comprises at least one non-linear transition lining element 200',300 which has a first 211,311 and a second 212,312 leg portion extending in non-parallel first 221,321 and second 222,322** leg directions, respectively.

One kind of transition lining element is the corner lining element 200'. The corner lining element 200' differs from the corner lining element 200 in FIG. 3 in that the corner lining element 200' has two leg portions only.

The lining 100' shown in FIG. 8 does not have any side linings. In is to be understood that alternative embodiments of a lining according to the disclosure may have one or more side linings. For example, a lining may have a bottom lining and a front lining but no side linings. In such a case, some transition lining elements 120 may form a lining transition between at least two non-parallel main lining elements 110 and other transition lining elements 120 may form a lining transition between a bottom lining **105*d*,105*e* and at least one of a side surface 105*a'*,105*b'* and a front surface 105*c'* of the haul truck body 10'. In other words, the plurality of main lining elements 110 extending over the bottom surface 105*d'*,105*e'* may be accompanied by a further plurality of main lining elements 110 extending over at least one of a side surface 105*a'*,105*b'* and a front surface 105*c'* of the haul truck body 10'**.

Another example embodiment where a two-legged corner lining element may be useful is for a haul truck body comprising right-angle vertical edges in the intersection between the front surface and the side surfaces. For such a geometry, main lining elements may be arranged to meet directly along the vertical edge, hence making the third portion unneeded.

The transition lining elements 120, comprising the corner lining element 200, the wedge lining element 300 and the edge lining element 400, are intended for a haul truck body. Typical dimensions of such haul truck bodies are 10-15 meters in length. Thus, the transition lining elements 120 are of considerable size. An inner radius of the concave main surface 205,305,405 of the example embodiments disclosed hereinabove is in the order of 550 mm, the outer radius being around 600 mm. The thickness W1 at an interface with a main lining element 110 on the bottom surface **105*d*,105*e* is 150 mm and the thickness W2 at an interface with a main lining element 110 on a side 105*a*,105*b* or front 105*c* surface is 100 mm. A length of an edge lining element 400 may be around 1.5 meter. The transition lining elements 120** are pressed and vulcanized in presses for rubber plates.

It should be clear from the detailed description that the exemplary embodiments of the transition lining elements 120 are designed such as to match a specific design of a haul truck body. Thus, the exemplary embodiments have rounded bottom surfaces to match rounded edge surface portions of the haul truck body. Haul truck bodies may be designed differently from the haul truck body 10 disclosed herein. For example, a haul truck body may have angled planar edge surface portions. As detailed hereinabove with reference to FIGS. 7A,B and D, the transition lining elements, as claimed herein, may have different cross sections such as to allow matching a haul truck body of specific design.

A method for assembling a lining 100 for a haul truck body 10 will now be described with reference to FIGS. 9A-E. As disclosed hereinabove, the lining 100 comprises a plurality of main lining elements 110 arranged to extend over main surfaces of the haul truck body 10, and a plurality of transition lining elements 120 arranged to extend over edge and corner portions of the haul truck body 10. The method comprises a series of steps.

Figure 9B:
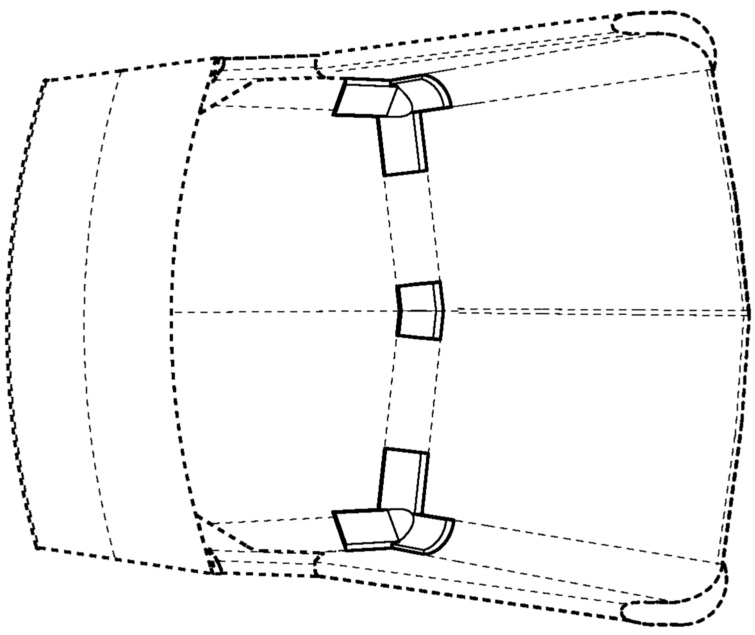
FIGS. 9A-E are perspective rear views of a haul truck body illustrating a method of fastening a lining according to embodiments of the disclosure
Figure 9A:
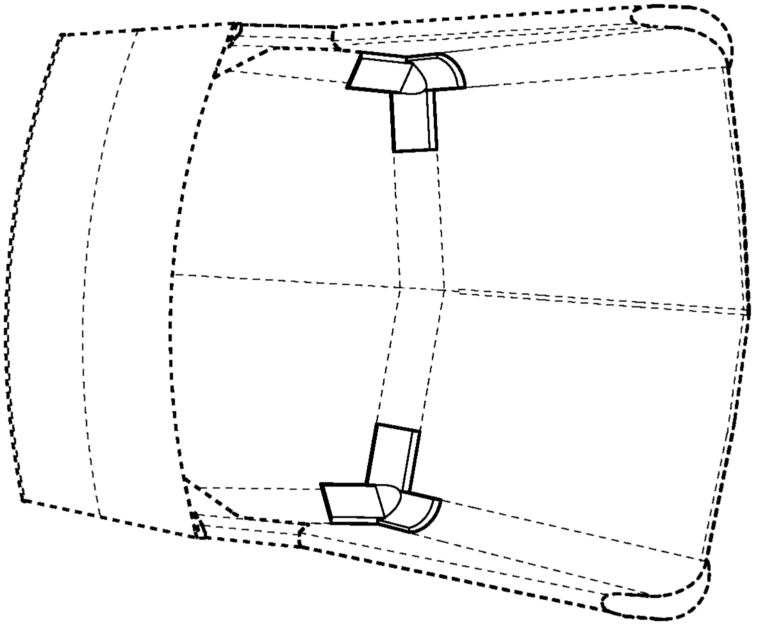

One step is positioning a pair of corner lining elements 200, forming part of the plurality of transition lining elements 120, at a respective front side corner of the haul truck body 10 (FIG. 9A).

One step is positioning a wedge lining element 300, forming part of the plurality of transition lining elements 120, at a transition area between a front surface **105*c* of the haul truck body 10 and two mutually inclined bottom surface portions 105*d*,105*e* of the haul truck body 10 (FIG. 9**B).

Figure 9D:
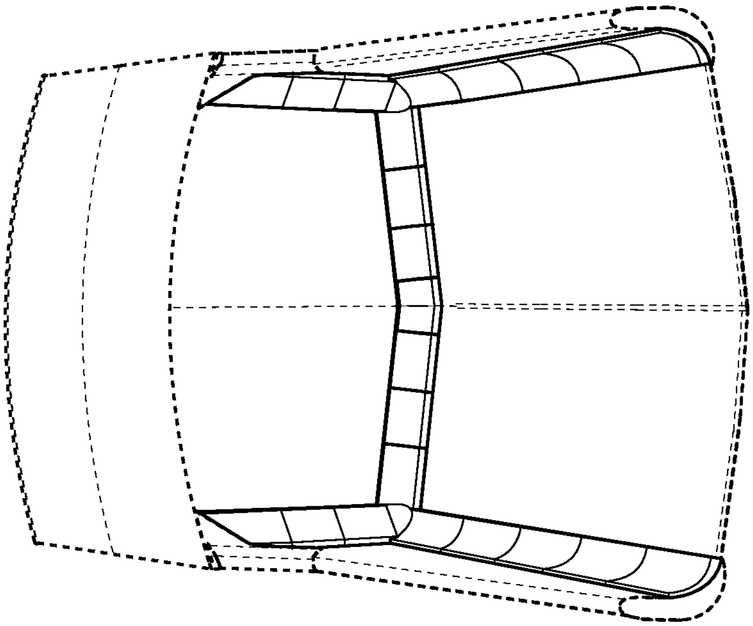
Figure 9C:
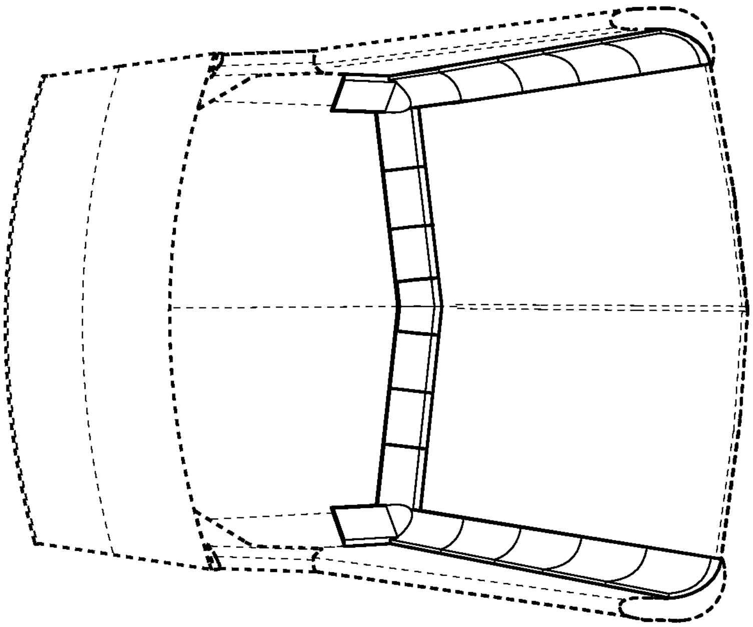

One step is positioning one or more edge lining elements 400, forming part of the plurality of transition lining elements 120, between the corner lining elements 200 and the wedge lining element 300, such as to form, together with the wedge lining element 300, a common transition between the pair of corner lining elements 200 (FIG. 9C).

One step is positioning one or more further edge lining elements 400, forming part of the plurality of transition lining elements 120, between the corner lining elements 200 and rear ends of the haul truck body 10 (FIG. 9D).

Figure 9E:
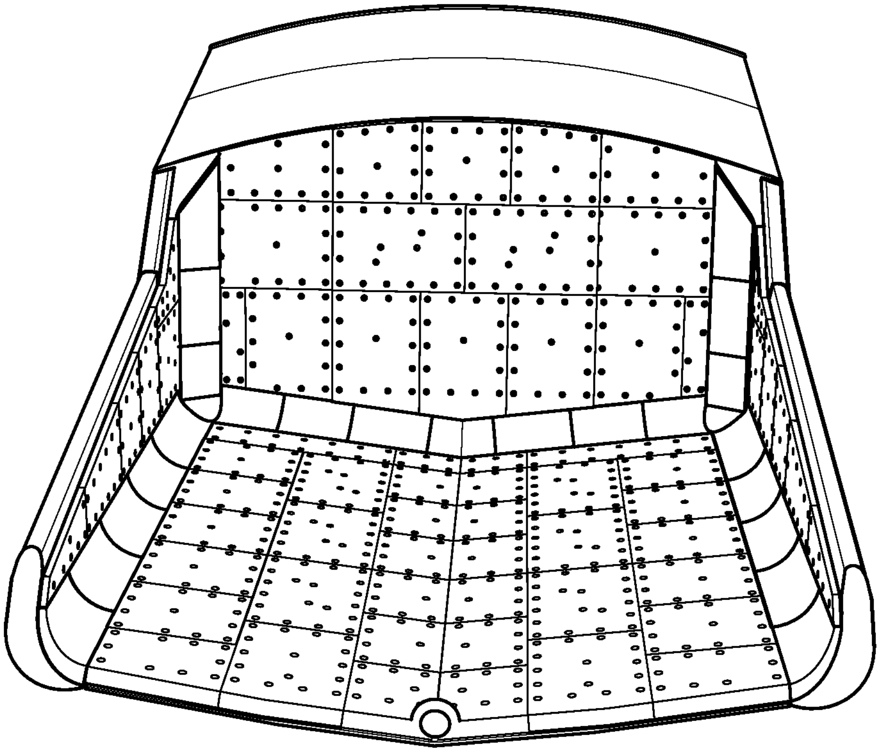

The method further comprises positioning the plurality of main lining elements 110 over main surfaces of the haul truck body 10 (FIG. 9E).

The method further comprises fastening the plurality of main lining elements 110 to the haul truck body 10, wherein the positioning of the plurality of main lining elements 110 is performed, in total or in part, after positioning of all the transition lining elements 120, such as to geometrically constrain the transition lining elements 120 by the fastened plurality of main lining elements 110.

The method further comprises fastening at least some transition lining elements of the plurality of transition lining elements 120 to the haul truck body 10. The fastening is achieved by using through bolts or an alternative fastening device penetrating through the through holes 250,350*a*, 350*b*,450*a*,450*b* of the transition lining element extending further into matching through holes of the haul truck body 10.

Two or more from the method steps may be performed in a different order with respect to each other than the order of which they are presented herein, if not explicitly disclosed otherwise.

ALTERNATIVE EMBODIMENTS

The embodiment described above and as shown in the figures may be varied in many ways without departing from the scope of the claims.

The length of the leg portions along respective leg direction thereof may be different. For example, a corner lining element may have a first portion being longer than a second portion. This is equally valid for a wedge lining element The cross sectional profile of the leg portions may be different for different portions. For example, a corner lining element may have a first cross sectional profile of the first portion and a second, different, cross sectional profile of the second portion. This may be useful in situations where main lining elements of different dimensions are to be used for different surfaces of the haul truck body. The thickness of the main lining elements may, for example be smaller on the side surfaces than on the front surface.

The corner lining element may have the same cross sectional profile for all three leg portions. The corner lining element may be symmetric. This would allow for using edge lining elements of the same type connecting to all three leg portions of the corner lining element.

The invention claimed is:

1. A lining for a haul truck body, said lining comprising a plurality of main lining elements arranged to extend over main surfaces of said haul truck body, and a plurality of transition lining elements arranged to extend over edge and/or corner portions of the haul truck body, each transition lining element forming a lining transition between non-parallel main lining elements of said plurality of main lining elements;

- wherein said plurality of transition lining elements comprises at least one non-linear transition lining element which has a first and a second leg portion extending in non-parallel first and second leg directions, respectively, said first leg portion forming a first lining transition between a first pair of non-parallel main lining elements, and said second leg portion forming a second lining transition between a second pair of non-parallel main lining elements; and
- wherein three main lining elements of said first pair and said second pair of main lining elements are all non-parallel to each other.

2. The lining according to claim 1, wherein said plurality of main lining elements form a bottom lining, a front lining and two opposite side linings, wherein said three non-parallel main lining elements of the first pair and the second pair of main lining elements are located at a corner of said lining so as to form part of the bottom lining, the front lining and one of the two opposite side linings, respectively, and wherein said at least one non-linear transition lining element comprises at least one corner lining element forming said first and second lining transitions between said three non-parallel main lining elements.

3. The lining according to claim 2, wherein said corner lining element further presents a third leg portion extending in a third leg direction different from said first and second leg directions, wherein the third leg portion forms a third lining transition between a third pair of non-parallel main lining elements, wherein three main lining elements of the first, second and third pairs of main lining elements are all non-parallel with each other, and wherein each one of said first, second and third leg portions extends from said corner to an adjacent transition lining element of said plurality of transition lining elements.

4. The lining according to claim 1, wherein said plurality of main lining elements form a bottom lining, a front lining and two opposite side linings, said bottom lining presenting non-parallel first and second mutually inclined bottom lining portions, and wherein said at least one non-linear transition lining element comprises a wedge lining element forming lining transitions between said three non-parallel main lining elements which are located at a wedge area of said lining and which form part of the front lining, the first bottom lining portion and the second bottom lining portion, respectively.

5. The lining according to claim 1, wherein at least some of said plurality of transition lining elements present a concave surface facing an interior of the haul truck body.

6. The lining according to claim 1, wherein at least some of said plurality of transition lining elements comprise through holes arranged for allowing fastening to a surface of the haul truck body.

7. The lining according to claim 1, wherein at least some of said plurality of transition lining elements comprise an elastic material.

8. The lining according to claim 7, wherein said elastic material comprises rubber or polyurethane.

9. The lining according to claim 1, wherein at least some of said plurality of transition lining elements comprise a structural element arranged to reinforce the transition lining element.

10. The lining according to claim 9, wherein said structural element comprises a steel backing plate completely or partly embedded in the transition lining element.

11. A lining for a haul truck body having a bottom surface, a front surface, and two opposite side surfaces, said lining comprising:

- a plurality of main lining elements extending over the bottom surface to form a bottom lining extending over said bottom surface; and
- a plurality of transition lining elements arranged to extend over edge and/or corner portions of the haul truck body along the bottom lining,
- wherein each transition lining element forms a transition between the bottom lining and at least one of said side surfaces and said front surface of the haul truck body;
- wherein said plurality of transition lining elements comprises at least one non-linear transition lining element which has a first and a second leg portion extending in non-parallel first and second leg directions, respectively,
  - wherein the first leg portion forms a first lining transition between the bottom lining and the front surface, and the second leg portion forms a second lining transition between the bottom lining and an associated one of the side surfaces.

12. A transition lining element for use in a lining for a haul truck body, said lining comprising a plurality of main lining elements which in use extend over surfaces of said haul truck body, wherein said transition lining element being arranged to form a lining transition between adjacent main lining elements of said lining; said transition lining element comprising:

a main surface;

a central portion;

a first leg portion and a second leg portion which extend from the central portion in non-parallel first and second leg directions, respectively, said first leg portion presenting a first end surface which connects to the main surface, and a first pair of side surfaces which extend from the central portion to the first end surface and connect to the main surface, and said second leg portion presenting a second end surface which connects to the main surface, and a second pair of side surfaces which extend from the central portion to the second end surface and connect to the main surface;

wherein:

said first and second end surfaces being arranged to connect to matching end surfaces of adjacent transition lining elements extending in said first and second leg direction, respectively, and each one of said side surfaces being arranged to connect to matching surfaces of adjacent main lining elements, said first leg portion being arranged to form a first lining transition in a first transition direction between a first pair of main lining elements connecting to said first pair of side surfaces of the first leg portion, said second leg portion being arranged to form a second lining transition in a second transition direction, different from said first transition direction, between a second pair of main lining elements connecting to said second pair of side surfaces of the second leg portion, and wherein said side surfaces of at least one of said first and second leg portions have mutually different widths transversely of the leg direction of the associated leg portion.

13. The transition lining element according to claim 12, wherein the main surface is at least partly concave.

14. The transition lining element according to claim 12, wherein at least some of said side surfaces connect to the main surface of the transition lining element at 90 degrees.

15. The transition lining element according to claim 12, further comprising a third leg portion which extends from the central portion in a third leg direction, said third leg direction being non-parallel with a plane defined by the first and second leg directions; wherein the transition lining element is a corner lining element arranged to form a lining transition between a front lining, a side lining and a bottom lining portion; wherein:

said third leg portion presents a third end surface which connects to the main surface, and a third pair of side surfaces which extends from the central portion to the third end surface and connects to the main surface, said third end surface being arranged to connect to a matching end surface of an adjacent transition lining element extending in said leg third leg direction, said third leg portion being arranged to form a third lining transition in a third transition direction, different from said first transition direction and said second transition direction, between a third pair of main lining elements connecting to said third pair of side surfaces of the third leg portion.

16. The transition lining element according to claim 12, wherein:

the transition lining element is a wedge lining element arranged to form a lining transition between a front lining and two inclined bottom lining portions; wherein:

a first side surface of said first leg portion connects to a first side surface of said second leg portion; and a second side surface of said first leg portion connects to a second side surface of said second leg portion.

17. A haul truck body comprising one from the list of:

one or more transition lining elements according to claim 12.

18. A haul truck comprising the haul truck body according to claim 17.

* * * * *